United States Patent
Bales et al.

(10) Patent No.: US 10,660,305 B2
(45) Date of Patent: May 26, 2020

(54) SYSTEMS FOR FEEDING CATS, METHODS OF USE OF THE SYSTEMS AND PACKAGING FOR THE SYSTEMS

(71) Applicant: Feline Environmental Enrichment Design Corporation, Philadelphia, PA (US)

(72) Inventors: Elizabeth B. Bales, Philadelphia, PA (US); Steven Krupnick, Philadelphia, PA (US); David Krupnick, Philadelphia, PA (US); Susan Ann Lohr, Philadelphia, PA (US); Phebe Kearney-Scott, Sewell, NJ (US)

(73) Assignee: Feline Environmental Enrichment Design Corporation, Philadelphia, PA (US)

( * ) Notice: Subject to any disclaimer, the term of this patent is extended or adjusted under 35 U.S.C. 154(b) by 186 days.

(21) Appl. No.: 15/761,856

(22) PCT Filed: Sep. 13, 2016

(86) PCT No.: PCT/US2016/051523
§ 371 (c)(1),
(2) Date: Mar. 21, 2018

(87) PCT Pub. No.: WO2017/053131
PCT Pub. Date: Mar. 30, 2017

(65) Prior Publication Data
US 2018/0271054 A1    Sep. 27, 2018

Related U.S. Application Data

(63) Continuation-in-part of application No. 15/074,557, filed on Mar. 18, 2016, now Pat. No. 10,085,418.
(Continued)

(51) Int. Cl.
*A01K 15/02* (2006.01)
*A01K 5/00* (2006.01)
*A01K 5/01* (2006.01)

(52) U.S. Cl.
CPC ............ *A01K 5/0114* (2013.01); *A01K 15/02* (2013.01); *A01K 15/025* (2013.01)

(58) Field of Classification Search
CPC .. A01K 15/025; A01K 5/0114; A01K 15/026; A01K 29/00; A01K 5/00; B65D 81/365
(Continued)

(56) References Cited

U.S. PATENT DOCUMENTS 2,086,631 A    7/1937  Munro
3,341,054 A    9/1967  Hirota
(Continued)

FOREIGN PATENT DOCUMENTS

DE    29703253 U1    6/1997
GB     2492110 A    12/2012
WO    2016/154257 A1    9/2016

OTHER PUBLICATIONS

International Search Report and Written Opinion of the International Searching Authority, dated Dec. 7, 2016, for International Patent Application No. PCT/US2016/051523.
(Continued)

*Primary Examiner* — Yvonne R Abbott-Lewis
(74) *Attorney, Agent, or Firm* — Morgan, Lewis & Bockius LLP

(57) ABSTRACT

A complete cat feeding system includes a plurality of feeding devices, each of the feeding devices having a container for containing and dispensing a portion of cat's daily food ration. Each container has a convexly curved external surface, a first port and a second port arranged along a top portion of the container providing access to an interior
(Continued)

space of the container, and a bridging wall separating the first port and the second port, the bridging wall extending above the first port and the second port. Each feeding device may further include a simulation covering constructed from a flexible material, the simulation covering having a pocket for receiving a portion of the container therein without covering the first port and the second port. The cat feeding system may include a training device providing a second container having more than two ports for containing and dispensing a portion of cat food.

17 Claims, 12 Drawing Sheets

Related U.S. Application Data

(60) Provisional application No. 62/221,768, filed on Sep. 22, 2015, provisional application No. 62/137,501, filed on Mar. 24, 2015, provisional application No. 62/221,768, filed on Sep. 22, 2015.

(58) Field of Classification Search
USPC .... 119/707, 708, 709, 710, 711, 702, 51.01, 119/61.5
See application file for complete search history.

(56) References Cited

U.S. PATENT DOCUMENTS

| | | | |
|---|---|---|---|
| 4,978,030 | A | 12/1990 | Morris et al. |
| 5,819,690 | A | 10/1998 | Brown |
| 6,098,571 | A | 8/2000 | Axelrod |
| 6,158,391 | A | 12/2000 | Simonetti |
| 6,167,841 | B1 | 1/2001 | Ho |
| 6,237,538 | B1 | 5/2001 | Tsengas |
| 6,378,464 | B1 | 4/2002 | Ritchey |
| 8,240,273 | B2 | 8/2012 | Benson |
| D790,138 | S | 6/2017 | Bales |
| D793,630 | S | 8/2017 | Bales |
| D801,593 | S | 10/2017 | Bales et al. |
| 9,834,371 | B2 | 12/2017 | Herrick et al. |
| 2002/0174838 | A1 | 11/2002 | Crane et al. |
| 2005/0268862 | A1 | 12/2005 | Morrison |
| 2006/0054106 | A1 | 3/2006 | Renforth |
| 2006/0137624 | A1 | 6/2006 | Lamstein |
| 2006/0213454 | A1 | 9/2006 | Wolfe, Jr. |
| 2006/0254531 | A1 | 11/2006 | Willinger |
| 2008/0083378 | A1 | 4/2008 | Pearce |
| 2009/0314221 | A1 | 12/2009 | Wang |
| 2010/0147229 | A1 | 6/2010 | DeFazio |
| 2010/0251966 | A1 | 10/2010 | Benson |
| 2010/0300363 | A1 | 12/2010 | Nangia |
| 2010/0326369 | A1* | 12/2010 | Freeman ............ A01K 15/026 119/709 |
| 2011/0083608 | A1 | 4/2011 | Markham |
| 2011/0185980 | A1 | 8/2011 | Chefetz |
| 2012/0067294 | A1 | 3/2012 | Curry |
| 2012/0318210 | A1 | 12/2012 | Anderson |
| 2013/0019812 | A1 | 1/2013 | Rutherford |
| 2013/0055965 | A1 | 3/2013 | Valle |
| 2013/0115400 | A1 | 5/2013 | Chou |
| 2013/0276711 | A1 | 10/2013 | Lipscomb et al. |
| 2014/0367284 | A1 | 12/2014 | Wurth et al. |
| 2014/0373788 | A1 | 12/2014 | Ragonetti |
| 2015/0101546 | A1 | 4/2015 | Simon |
| 2016/0029597 | A1 | 2/2016 | Gratza |
| 2016/0120146 | A1 | 5/2016 | Parness |
| 2016/0165845 | A1 | 6/2016 | Stone |
| 2016/0219835 | A1 | 8/2016 | Faecher |
| 2016/0278341 | A1 | 9/2016 | Bales et al. |
| 2016/0316719 | A1 | 11/2016 | Parness |

OTHER PUBLICATIONS

"Cat Treat Dispenser Toys Review," <http://www.catfood-dispensersreviews.com/cat-treat-dispenser-toys-reviews/>, accessed Jul. 26, 2016.

International Search Report and Written Opinion of the International Searching Authority, dated Jun. 24, 2016 for International Patent Application No. PCT/US2016/023693.

Horwitz et al., "Cat Behavior and Training—Enrichment for Indoor Cats," dated Nov. 30, 2008, <https://vcahospitals.com/know-your-pet/cat-behavior-and-training-enrichment-for-indoor-cats>, accessed Oct. 4, 2017.

"Holiday Tips for Happy Pets," Kong Company, <https://web.archive.org/web/20120715085715/https://www.kongcompany.com/expert-tips/holiday-tips-for-happy-pets/>, accessed Oct. 4, 2017.

Australian Patent Application No. 2016235262, Examination Report No. 1, dated Sep. 26, 2018, 3 pages.

* cited by examiner

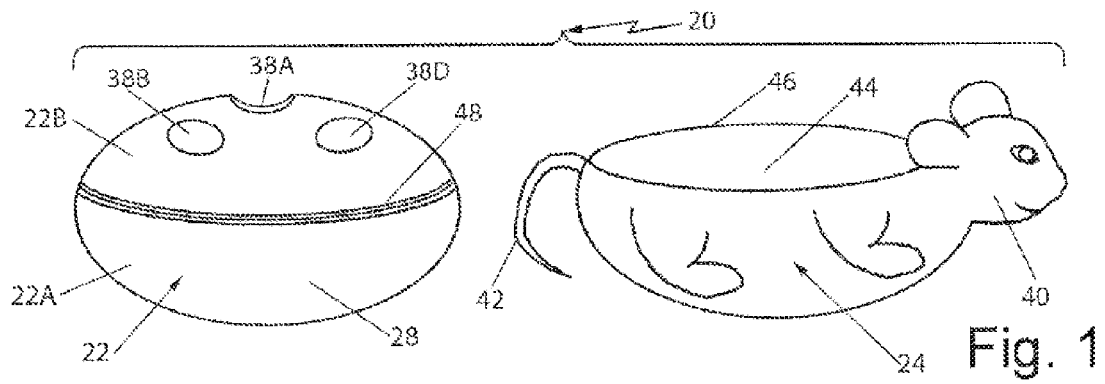
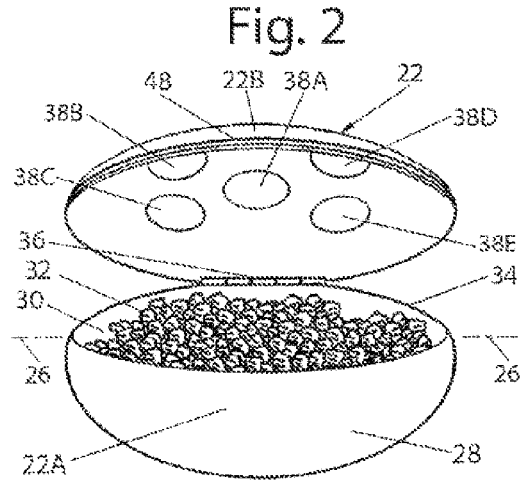
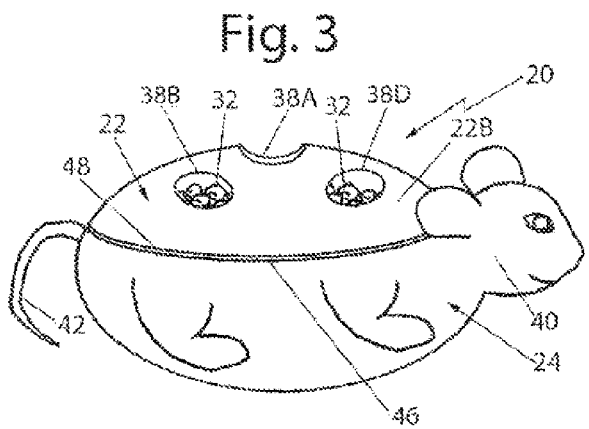
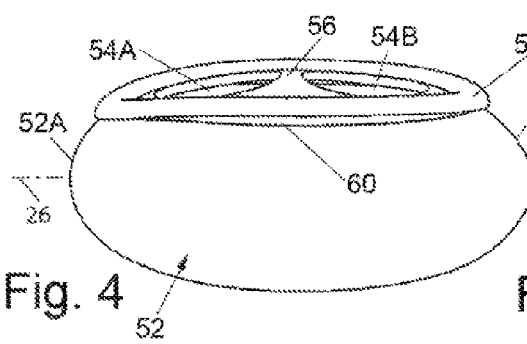
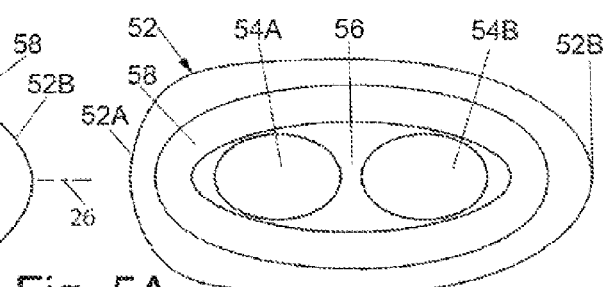
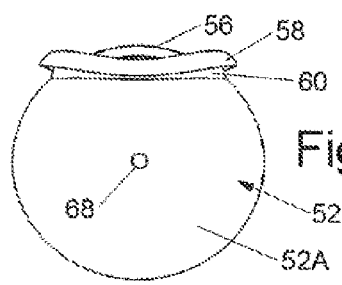
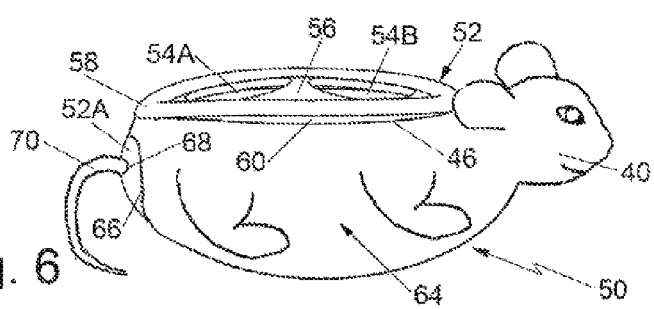

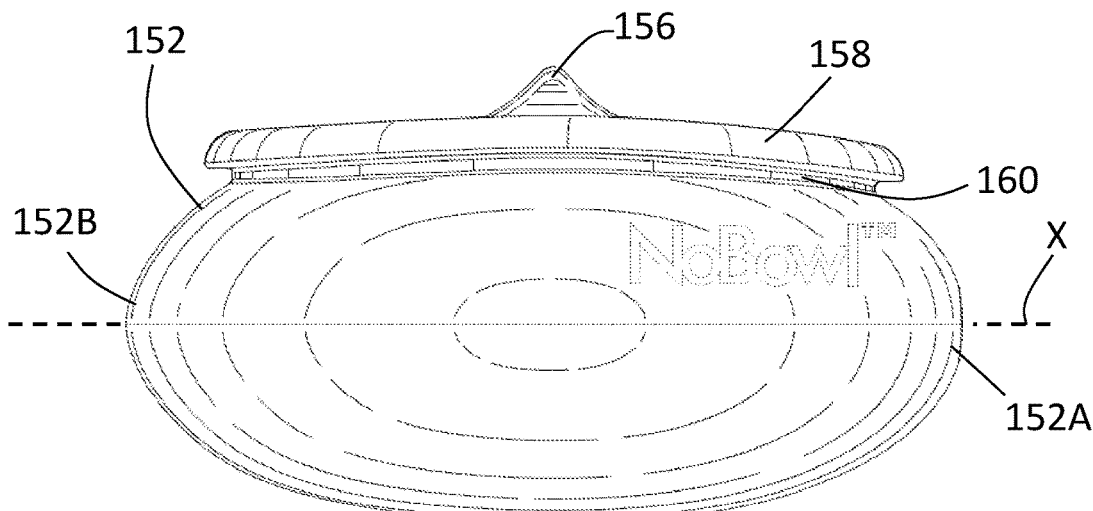
Fig. 10C
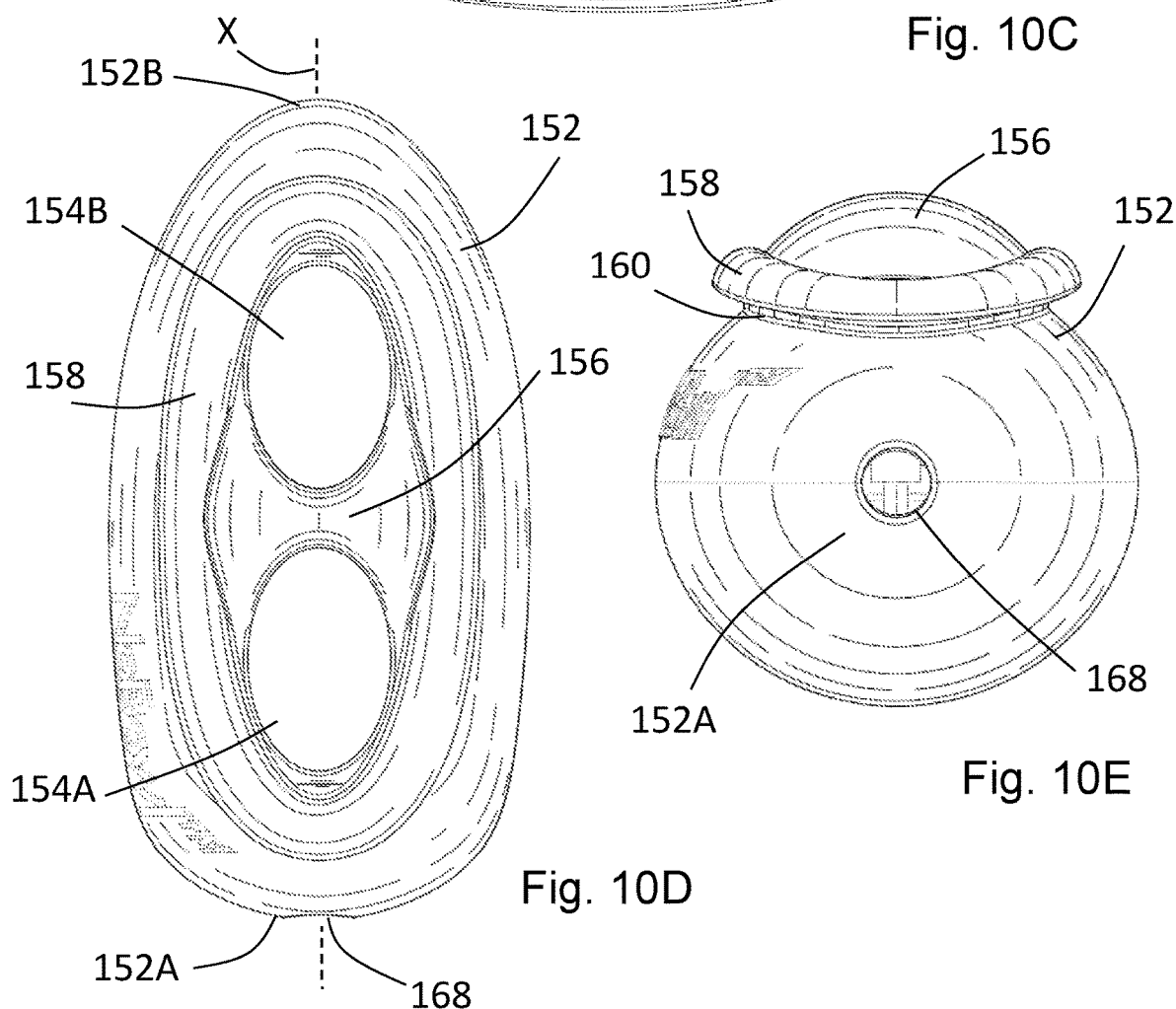
Fig. 10D
Fig. 10E

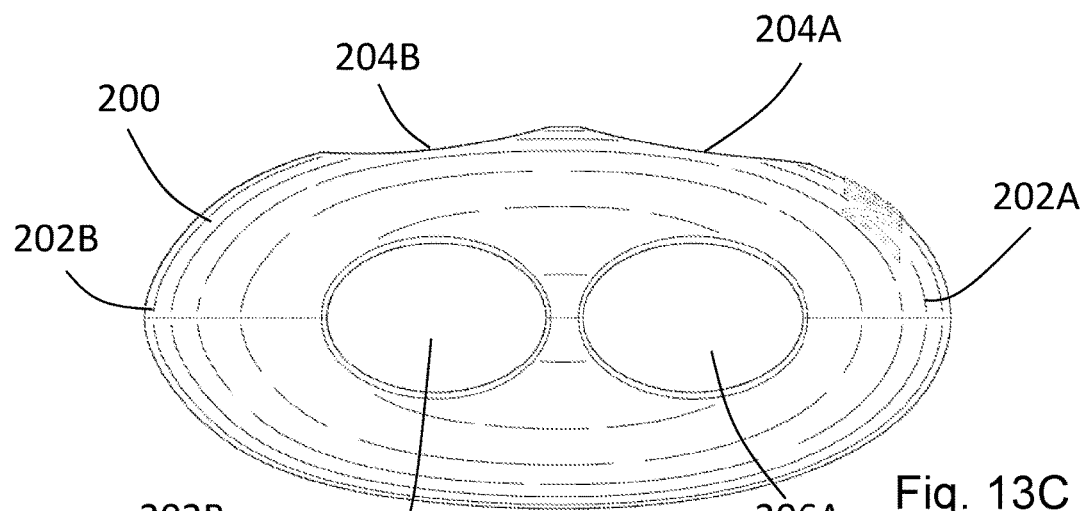
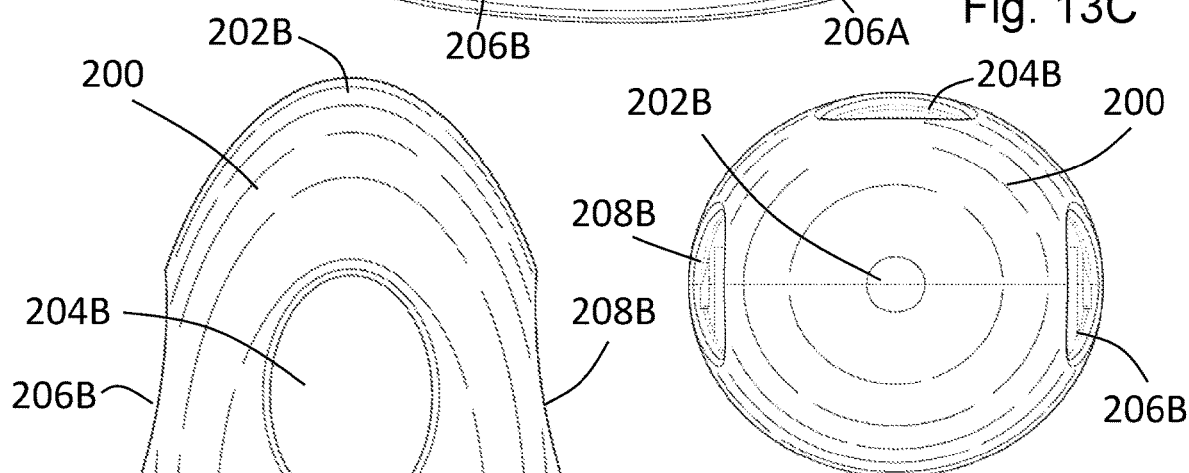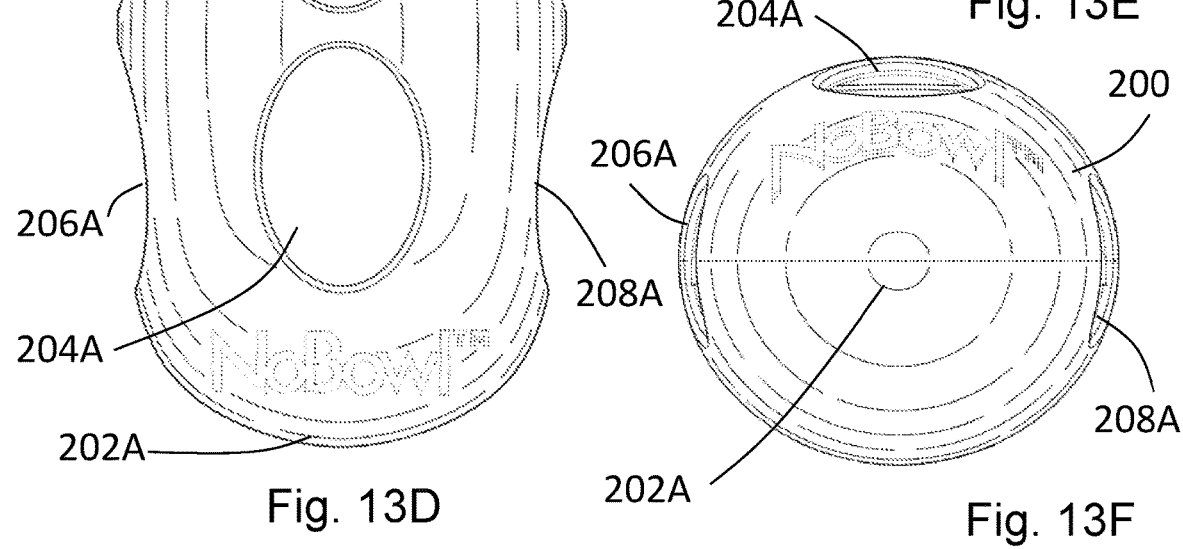
Fig. 13C
Fig. 13D
Fig. 13E
Fig. 13F

SYSTEMS FOR FEEDING CATS, METHODS OF USE OF THE SYSTEMS AND PACKAGING FOR THE SYSTEMS

CROSS-REFERENCE TO RELATED APPLICATIONS

This application is a U.S. National Stage of International Application No. PCT/US2016/051523, filed on Sep. 13, 2016, which claims the benefit of U.S. Provisional Application No. 62/221,768, filed on Sep. 22, 2015, and is a continuation-in-part of U.S. application Ser. No. 15/074,557, filed Mar. 18, 2016, which in turn claims the benefit of U.S. Provisional Application No. 62/137,501, filed on Mar. 24, 2015, and U.S. Provisional Application No. 62/221,768, filed on Sep. 22, 2015, all of which are incorporated in their entireties by reference herein.

FIELD OF THE INVENTION

The disclosed invention relates to dispensing devices and more particularly to feeding systems for use by a cat to dispense cat food therefrom when played with by the cat, methods of feeding a cat, and packaging for such feeding systems.

BACKGROUND OF THE INVENTION

The American Veterinary Medical Association recommends that cats in urban and suburban environments be kept indoors. However, a cat's health and welfare can be affected by its surroundings. In this regard, cats are natural hunters. Even indoors, cats retain their predatory instincts and behaviors, including stalking, clawing, chewing, and marking. When cats live indoors, they are deprived of natural outlets for these behaviors. Under these circumstances cats may begin to express undesirable behaviors, including scratching furniture and eliminating outside of the litter box.

While commercially available dry cat food satisfies the nutritional needs for domestic cats, it does nothing to allow a cat to express its natural hunting behavior. It is much healthier for cats to be given the option to hunt for prey. Failure to provide opportunities to hunt deprives cats of mental stimulation and physical activity. This can cause obesity and other health and behavioral problems. Accordingly, a need exists for a cat food feeding system that enables an indoor cat to employ its natural hunting instincts.

The subject invention addresses that need by providing feeding systems for indoor cats to enable such cats to feed themselves several times a day with dry cat food in a safe, easy-to-use manner that enriches their body, mind and spirit.

In addition, the subject invention is directed to packaging for such cat feeding systems.

SUMMARY OF THE INVENTION

In accordance with one aspect of this invention there is provided a feeding device for use by a cat to dispense dry cat food from the device. The feeding device comprises a hollow container having an internal cavity and at least one outlet port in communication with the internal cavity. The feeding device has an arcuate external surface providing the appearance of a creature that constitutes prey of a feral cat. The arcuate external surface is configured to roll on a surface when the cat plays with the feeding device, whereupon the action of the cat playing with the feeding device results in the automatic gradual dispensing of a portion of the cat food out of the at least one outlet port.

In accordance with one aspect of this invention the feeding device comprises the hollow container and a simulation covering. The hollow container has an internal cavity, an entry port and at least one outlet port. The at least one outlet port is in communication with the internal cavity and is configured to enable a portion of the cat food to gradually pass through the at least one outlet port. The simulation covering comprises a soft material having a pocket to receive at least a portion of the hollow container, whereupon the at least one outlet port is exposed. The simulation covering has an exterior surface providing the appearance of a creature that constitutes prey of a feral cat such that when the hollow container is disposed within the pocket of the simulation covering the cat will play with the feeding device. The action of the cat playing with the feeding device results in the automatic gradual dispensing of a portion of the cat food out of the at least one outlet port.

In accordance with another aspect of this invention the hollow container has a longitudinal axis and an arcuate sidewall bounding the interior cavity. The interior cavity is filled with dry cat food. The arcuate sidewall has an outer surface providing the appearance of a creature that constitutes prey of a feral cat and includes a plurality of frangible areas. Each of those areas is configured to be opened to form respective outlet ports in the sidewall. The outlet ports are in communication with the internal cavity and are configured to enable a portion of the dry cat food to gradually pass therethrough when the cat plays with the feeding device.

In accordance with one preferred aspect of the invention the feeding device is a part of a feeding system including plural feeding devices, each of which is arranged to hold a portion of the cat's daily ration of dry cat food and which can be located in various locations to which the cat has access. This enables the cat to utilize its natural hunting instinct to feed itself several times a day.

The subject invention also includes a method for feeding a cat a predetermined portion of a daily ration of cat food each day such that the cat eats its daily ration each day. The method basically entails making a feeding device constructed in accordance with this invention available to the cat so that the cat will "hunt" for the feeding device and play with it when found, whereupon a portion of the cat food disposed within the internal cavity can gradually exit the at least one port when the cat plays with the device.

In accordance with one preferred aspect of the method of this invention plural, e.g., five, feeding devices, each filled with a predetermined portion of the daily ration of cat food, are disposed at various locations to which the cat has access, such that the cat can find each of the feeding devices to play with each of them and thereby have access to the food contained therein.

In accordance with another aspect of this invention there is provided a package holding a plurality of feeding devices. Each of the feeding devices is configured for use by a cat to dispense dry cat food therefrom. Each of the feeding devices comprises a container, e.g., an ovoid, ellipsoid, sphere or other three dimensional shaped hollow body, having a longitudinal axis and an arcuate sidewall bounding an interior cavity. The interior cavity is filled with dry cat food. The sidewall has an outer surface providing the appearance of a creature that constitutes prey of a feral cat. The arcuate sidewall includes a plurality of frangible areas, e.g., a line of perforations, each of which is configured to be opened to form respective outlet ports in the sidewall. The outlet ports, when formed are in communication with the internal cavity and are configured to enable a portion of the dry cat food to gradually pass therethrough. Each of the feeding devices is configured to be played with by a cat so that the action of the cat playing with the feeding device results in the automatic gradual dispensing of a portion of the cat food out of the outlet ports.

One preferred aspect of the package includes a sufficient number feeding devices, each holding a portion of the cat's daily ration of food, and which collectively provide the cat with his/her daily ration of cat food.

In some embodiments, the feeding systems of the present invention are configured to provide a complete feeding system for a cat. In some embodiments, feeding systems of the present invention are configured to supply a cat's entire daily ration of food. In some embodiments, for example, a feeding system of the present invention may be used to replace a cat's other means for feeding, e.g., a typical food bowl. In some embodiments, a feeding systems of the present invention is configured to provide a cat with multiple portion-controlled feeding devices to hunt throughout the course of the day and can therefore allow the cat to be in charge of its own feeding schedule.

A feeding system according to some embodiments of the present invention includes a plurality of feeding devices, each of the plurality of feeding devices including a container for containing and dispensing a portion of food. In some embodiments, each container has a convexly curved external surface, a first port and a second port arranged along a top portion of the container, each of the first port and the second port providing access to an interior space of the container, and a bridging wall separating the first port and the second port, the bridging wall extending above the first port and the second port. In some embodiments, each feeding device further includes a simulation covering constructed from a flexible material, the simulation covering including a pocket for receiving at least a portion of the container therein without covering the first port and the second port. In some embodiments, the container has an ovoid shape. In some embodiments, the container further comprises a raised ridge surrounding the first port, the second port, and the bridging wall. In some embodiments, the first port and/or the second port includes a limiting device (e.g. sliding door, plug, etc.) for reducing the size of and/or closing the opening of the port.

In some embodiments, the simulation covering is sized and shaped to form a tight fit around substantially the entire container except for the first port, the second port, the bridging wall, and the raised ridge. In certain embodiments, the simulation covering has the appearance of an animal, for example, a mouse, bird, fish, etc. In some embodiments, the simulation covering includes a front end including a projection having a three-dimensional shape which mimics an appearance of a head of the animal. In some embodiments, the simulation covering includes a rear end opposite the front end, the rear end having a rear opening that is sized to receive the container therethrough. In certain embodiments, the rear end of the simulation covering further includes a drawstring threaded around the rear opening, the drawstring being configured to cinch the rear opening closed. In yet further embodiments, each of the plurality of feeding devices further includes a tracking device configured to communicate a location and/or movement of the feeding device.

In some embodiments, the feeding system of the present invention further includes at least one training device, the training device including a second container for containing and dispensing a portion of food. In some embodiments, the second container has a convexly curved external surface and having more than two ports providing access to an interior space of the second container. The training device may further have an ovoid shape and, in some embodiments, may include at least three pairs of ports. In some embodiments, the first port and the second port of each of the plurality of feeding devices and the ports of the training device have substantially the same size and shape (e.g., oval shape). In some embodiments, the one or more of the ports of the training device may include a limiting device (e.g. sliding door, plug, etc.) for reducing the size of and/or closing the opening of the port. In some embodiments, the training device is not provided with a simulation covering. In some embodiments, the feeding system includes 5X feeding devices and 1X training devices, wherein X is a positive integer (e.g., X=1, 2, 3, 4, etc.). X may be equal to the number of cats for which the feeding system is intended to be utilized by. In some embodiments, the feeding system further comprises at least one measuring device for measuring a predetermined volume of food into each of the plurality of feeding devices and/or the training device.

BRIEF DESCRIPTION OF THE DRAWING FIGURES

FIG. 1 is an isometric view of one exemplary hollow container and one exemplary simulation covering which together make up a feeding device forming one component of a cat feeding system constructed in accordance with this invention;

FIG. 2 is a slightly enlarged isometric view of the exemplary hollow container shown in FIG. 1, with its lid being opened to enable it to be filled with a portion of a cat's daily ration of dry cat food;

FIG. 3 is a slightly enlarged isometric view of the filled hollow container shown in FIG. 1 after its lid has been closed and after it has been inserted into the simulation covering to result in a feeding device which has the appearance of a creature that constitutes prey of a feral cat;

FIG. 4 is an isometric view of an alternative and preferred exemplary hollow container constructed in accordance with this invention and configured for use with another exemplary covering constructed in accordance with this invention;

FIG. 5A is a top plan view of the preferred exemplary hollow container shown in FIG. 4;

FIG. 5B is an end view of the preferred exemplary hollow container shown in FIG. 4;

FIG. 6 is an isometric view of the preferred exemplary hollow container shown disposed within another exemplary covering constructed in accordance with this invention;

FIG. 10C is a side elevational view of the hollow container of FIG. 10A;

FIG. 10D is a top plan view of the hollow container of FIG. 10A;

FIG. 10E is rear elevational view of the hollow container of FIG. 10A;

FIG. 13C is a side elevational view of the training container of FIG. 13A;

FIG. 13D is a top plan view of the training container of FIG. 13A;

FIG. 13E is a front elevational view of the training container of FIG. 13A;

FIG. 13F is a rear elevational view of the training container of FIG. 13A;

DETAILED DESCRIPTION OF THE PREFERRED EMBODIMENTS

Figure 7:
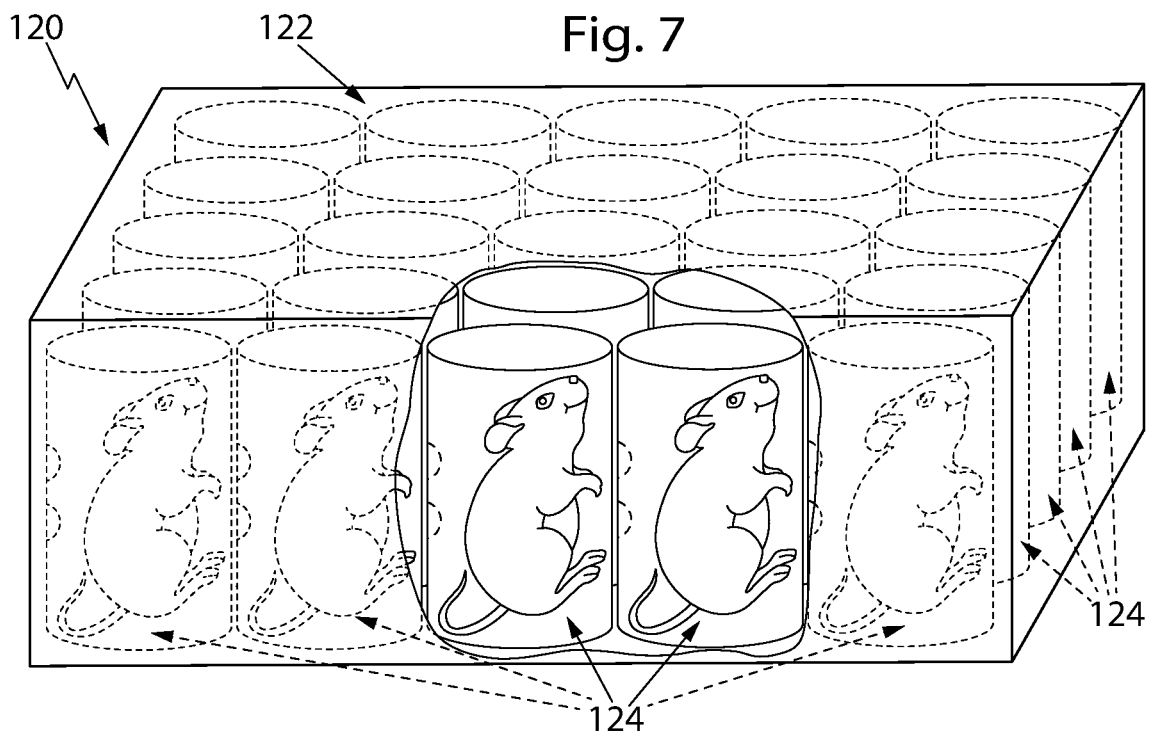
FIG. 7 is an isometric view, partially broken away, of one exemplary package holding a plurality of feeding devices, each of which is constructed in accordance with one aspect of this invention and is configured for use by a cat to dispense dry cat food therefrom.

Referring now to the drawings wherein like characters refer to like parts, there is shown in FIG. 1 an exemplary embodiment of a feeding device 20 constructed in accordance with this invention. The device 20 forms a portion of a feeding system of this invention. That feeding system includes plural feeding devices. In certain embodiments, each feeding device is configured so that it provides the appearance of a creature on which a feral cat preys for food. It has been determined that in nature the average feral cat hunts and eats five times a day. Accordingly, in accordance with one preferred aspect of this invention the system includes five feeding devices, each of which is filled with one fifth of the cat's daily ration of dry cat food. The feeding devices are disposed throughout the cat's environment in the home, and preferably are hidden, so that the cat will "hunt" for them, thereby providing the cat with natural stimulation. Owing to the shape of the feeding device, i.e., it is configured to roll about its longitudinal axis, and its appearance, i.e., simulating a prey animal, when the feeding device is found and the cat plays with it, a portion of the dry cat food within the feeding device will be automatically dispensed out of it gradually, thereby enabling the cat to eat the dispensed food. This action provides further stimulation for the cat, in addition to feeding it.

As can be seen in FIG. 1 the feeding device 20 basically comprises two components, namely, a hollow container 22 and a simulation covering or "skin" 24. The hollow container is formed of any suitable hard and rugged material, such as a plastic, and has the shape of an ovoid, ellipsoid, sphere or other three dimensional shape having a longitudinal axis 26 (FIG. 2) and an arcuate outer surface 28. The arcuate outer surface of the container enables it to be rolled around the axis 26 when the cat plays with the feeding device, as will be described later. Being hollow, the container 22 includes an internal cavity 30 (FIG. 2) which is arranged to hold a portion of a typical indoor cat's daily ration of dry cat food 32. That daily ration of dry cat food is approximately 1.25 cups for the average indoor cat. Thus, if the system makes use of five feeding devices, that 1.25 cups of dry cat food will be divided equally among the five feeding devices. In accordance with one exemplary embodiment of this invention the hollow container has a length of approximately 3.5 inches and a height of approximately 2.5 inches.

The filling of the internal cavity 30 of the container 22 is achieved by means of an inlet port that is in communication with the interior of the internal cavity. To that end, in the exemplary embodiment shown the hollow container includes a main section 22A and a lid section 22B. The top edge of the main section is in the form of a mouth or opening 34 (FIG. 2), which serves as the inlet port to the container 22. The lid section 22B is connected to the main section 22C by a hinge 36. This enables the lid section 22B to be pivoted from a closed position, like shown in FIG. 1, to an open position, like shown in FIG. 2.

In the open position the lid section is pivoted up from the opening 34, thereby exposing the internal cavity 30 so that it can be filled with the portion of dry cat food 32. Once filled, the lid section can be pivoted down to the closed position to thereby close the mouth of the main section to hold the food within the container.

Not only does the use of the hinged lid section 22B provide a means for readily filling the hollow container via a large opening, i.e., the mouth of the main section, the large opening also enables one to readily clean the internal cavity, when necessary. While not shown the lid section and the main section may include some releasable connector, e.g., a snap-fit connector, to hold the lid section in the closed position so that it does not accidentally open when the cat plays with the feeding device.

The lid section also includes at least one outlet port through which the dry cat food within the container can pass when the cat plays with the feeding device. In the exemplary embodiment shown, the at least one outlet port is in the form of five openings or ports 38A, 38B, 38C, 38D and 38E, with the port 38A being centrally located in the lid section and with the other ports disposed about the central port 36A. Each port is of a sufficient size, e.g., 0.375 in.×0.625 in., to enable the dry cat food within the container to gradually exit through one or more of the ports as the cat plays with the feeding device.

The simulation covering or skin 24 is formed of a soft, flexible fabric or other material that, in some embodiments, provides the appearance of an animal or creature, e.g., rodent, bird, fish, etc., that constitutes the prey of a feral cat. It should be appreciated that skin 24 may have any other appearance according to further embodiments of the invention, for example, circus or carnival characters, cartoon characters, famous persons or characters, holiday characters, etc. In yet further embodiments, skin 24 may have the appearance of an inanimate object, for example, a sports ball (football, soccer ball, tennis ball, baseball, etc.) or an abstract shape. It should thus be appreciated that the specific appearance of skin 24 is not necessarily limited to animals or the particular design shown in the illustrated embodiments of the appended Figures. In the exemplary embodiment shown the simulation covering provides the appearance of a mouse. To that end, the simulation covering may be a furry fabric that includes a projection 40 located at one end of the simulation covering and which is in the shape of the head of a mouse and another projection 42 at the other end of the simulation covering and which is in the shape of the tail of the mouse. The projection 40 includes graphics representing the eyes, nose and mouth of the mouse. The central portion of the simulation covering is in the form of a hollow pocket 44 (FIG. 1) shaped and sized to accommodate at least a portion of the hollow container 22 therein and which when the container is located therein makes up the body of the mouse. Graphics representing the mouse's legs are provided on the outer surface of the central portion of the simulation covering. The fact that the head and tail of the mouse are located on opposite ends of the longitudinal axis 26 when the hollow container is disposed within the pocket 44 of the simulation covering enables the resulting feeding device to be able to roll about that axis when played with by the cat. Moreover, since the legs of the mouse are merely graphics on the body, as opposed to members projecting outward from the body, they will not interfere with the rolling action of the feeding device.

It should be pointed out at this juncture, that the head and tail of the mouse may not be in the form of projections, but rather may be in the form of graphics on the outer surface of the simulation covering. Moreover, the simulation covering need not provide the appearance of a mouse, but can provide the appearance of any other rodent, bird, fish or other creature upon which constitutes the prey of a feral cat. Thus, in the case of a bird the simulation covering 22 can include one projection which is in the form of a bird's head and beak, and another projection which is in the form of the bird's tail. Alternatively the head, beak and tail may merely be in the form of graphics on the outer surface of the simulation covering. So too, if the simulation covering is in the form of a fish, it may include a projection which is in the form of a fish's head and mouth, and a projection which is in the form of the fish's tail. As noted above, in other embodiments, the appearance of the simulation covering need not be configured like an animal and other shapes may be used.

In order to ensure that the hollow container doesn't shift within the pocket and to hold it securely in place within the pocket the entryway to the pocket is in the form of an elasticized edge 46. That elasticized edge is arranged to be received within an annular peripheral groove 48 in the outer surface of the lid section adjacent the free edge of the lid section. Thus, when the hollow container 22 is disposed within the pocket 44 of the simulation covering 24 the elasticized edge 46 of the pocket will tightly engage the peripheral groove 48 to hold the hollow container in place. Such action will prevent the simulation covering from blocking any of the outlet ports 38A-38E when the cat plays with the feeding device.

As mentioned above, a preferred embodiment of the system of this invention makes use of five feeding devices 20 which are filled with the cat's regular dry food and which are disposed, e.g., hidden, at various locations in the cat's normal environment. Some cats may need a refresher course on how to "hunt" and hence feed themselves with the system of this invention. To that end, one can train the cat to use the system. In particular, such training can be accomplished by putting one half of the cat's regular meal in its bowl and one half into a feeding device constructed in accordance with this invention and which is placed near the cat's bowl. That feeding device may be in the form of the feeding device 20 as described earlier or a "trainer" device having more exit ports to allow the food to fall out more easily. In any case, the training method should entail allowing the cat to experiment with getting the food out of the feeding device. Day after day as the cat gets the hang of it, one can gradually put more of the cat's food in the feeding device and less into the cat's bowl. Once the cat has the learned how to use the feeding device, one can then start hiding plural feeding devices in the cat's environment for it to find. Preferably that is done in the beginning by hiding the feeding devices in obvious places, e.g., a few feet away from the cat's regular dining spot. Gradually over the next few weeks, one can make the hiding spots more difficult to find. To enhance the training of the cat, one should attempt avoiding placing the feeding devices near things which produce mechanical noises, such as refrigerators, washing machines, dryers, furnaces, etc.

As should be appreciated by those skilled in the art, the fact that the feeding devices of the subject invention automatically dispense only a portion of the dry cat food therein as the cat plays with the device ensures that the release of the cat food is accomplished in a gradual manner. This action is important inasmuch as it forces the cat to slow down its eating process so that it doesn't gobble its food, which action could encourage vomiting.

It should be pointed out at this juncture that while the preferred system as described above makes use of five feeding devices, the system may make use of any number of feeding devices, including only a single such device.

A further and more preferred exemplary embodiment of a container 52 constructed in accordance with this invention is shown in FIG. 4. The container 52 is configured to be used with, i.e., disposed within, a simulation covering or "skin" 64, that is similar in construction to the skin 24 described above to result in a feeding device 50, like shown in FIG. 9. The feeding device 50 is used in the same manner as described above with reference to the feeding device 20 and is played with by the cat to feed itself in the same manner as described above. Thus in the interest of brevity the manner of use of the feeding device 50 will not be reiterated.

As best seen in FIGS. 4 and 5, the container 52 is of an ovoid shape having a rear end portion 52A and a front end portion 52B. A central longitudinal axis 26 (FIG. 4) extends between the front end portion 52B and the rear end portion 52A. As best seen in FIG. 5A the rear end portion is has a lesser degree of curvature than the front end portion and the container 52 is of a generally circular cross-section as best seen in FIG. 5B. The container 52 is formed of a similar material to that of container 22. Unlike the container 22, the container 52 does not include a hinged lid. Instead the container 52 includes a pair of relative large openings or ports 54A and 54B located on the top portion of the container. Each port is of an oval-like shape and has a dimension of approximately 0.625 in. wide by approximately 0.81 in. long. The ports 54A and 54B serve as the means for filling the container with the requisite ration of the cat's dry food and also serve as the means through which the dry food exits when the cat plays with the feeding device 50.

The ports 54A and 54B are separated by a bridging wall 56 whose outer peripheral surface constitutes a continuation of the circular periphery of the container 52. Thus, the bridging wall doesn't impede the rolling action of the feeding device 50 when the cat plays with it. In the exemplary embodiment shown, the width of the bridging wall, i.e., the spacing between the ports 54A and 54B is approximately 0.31 in.

A rounded ridge 58 projects outward from the outer surface of the container 52 and surrounds the area encompassed by the ports 54A and 54B and the intermediate bridging wall 56. An annular groove 60 is located immediately below the ridge 58 and serves to cooperate with an elasticized portion of the skin 64 to hold the container within the pocket of the skin and to ensure that it doesn't shift within the pocket. In particular, as can be seen in FIG. 6, the skin 64 is similar in construction to the skin 24. In the interest of brevity the common features of the skin 64 with the skin 24 will be given the same reference numbers and the details of their construction and operation will not be reiterated. The skin 64 includes a top opening having an elasticized edge 46 which is configured to be received within the annular groove 60. Thus, when the hollow container 52 is disposed within the pocket 44 of the simulation covering 64 the elasticized edge 46 of the pocket will tightly engage the groove 60 to hold the hollow container 52 in place. Such action will prevent the simulation covering 64 from blocking either of the ports 54A or 54B when the cat plays with the feeding device 50.

The skin 64, is somewhat different than the skin 24, in one respect, namely, it includes a back opening 66 which exposes a rear portion 52A of the container 52. That rear portion includes a small aperture 68 (FIG. 5) that is in communication with the interior of the container. The aperture 68 is configured to releasably mount an item which simulates a portion of the prey animal that the skin represents. Thus, in the example shown the aperture 68 is shown mounting a flexible tail 70 to the container, i.e., the proximal end of the tail 70 is releasably mounted within the aperture 68. Other shaped tails could be mounted onto the container via the aperture to change the appearance of the prey animal. Moreover, if the skin provides the appearance of a fish, the aperture 58 can be used to mount a fish tail to the container. Similarly, if the skin provides the appearance of a bird, the aperture 58 can be used to mount a bird tail to the container. In fact, it is contemplated that the container will have an opening 58 in its front end portion 52B and that the skin 64 will have an opening in its forward end such that the container can be placed in the pocket whereupon an aperture 58 in the front end portion 52B of the container is exposed by the open forward end of the skin. In that case, an item simulating the head of the prey animal simulated by the skin 64 can be releasably mounted onto the container. Further still the container may include apertures 68 in its forward and rearward ends for use with skins having opening in their forward and rearward ends for mounting head and tail simulating items to the forward and rearward ends, respectively, of the container 52. Whether the aperture(s) 68 serve to mount a tail-simulating item or a head-simulating item, is not relevant. What is relevant is that the head or tail simulating item that the aperture 68 mounts on the container 52 is done in such a way that it can be readily removed by the cat owner. That factor and the factor that the container can be readily removed from the pocket of the skin itself, enable the cat owner to disassembly the feeding device when necessary to clean its various components. Once cleaned the feeding device can be reassembled and refilled for reuse by the cat.

It should be appreciated by those skilled in the art that the construction of each feeding device may be different than the exemplary embodiments shown in FIGS. 1-6. For example, the hollow container may be constructed like the embodiment of FIG. 4 so that it doesn't include a hinged lid, but unlike that embodiment only make use of a single large opening or hole through which the hollow container is filled. In such an alternative embodiment, the opening or hole through which the food is introduced has to be large enough to facilitate filling and to enable the interior of the hollow container to be cleaned when necessary. In such a case, the simulation covering and/or the hollow container should be constructed or configured so that the large opening is blocked by a portion of the simulation covering when the container is in the pocket of the covering to prevent the egress of the dry cat food therethrough, while enabling the dry cat food from gradually passing through one or more of the device's outlet ports.

Commercial embodiments of the system of this invention may be in the form of a kit of plural hollow containers and plural simulation coverings or skins. The skins are preferably interchangeable and can provide the appearance of the same animal or of different animals. Moreover, the skins may all be of the same color or may be of different colors. In addition, different skins may be sold separately to be substituted for the skins of the kit to provide additional stimulation for the cat.

Referring now to FIG. 7, there is shown one exemplary embodiment of a package system 120 constructed in accordance with this invention. That system basically comprises a package 122 holding plural feeding devices 124, each of which is constructed in accordance with this invention. The package 122 can be of any suitable construction, e.g., a typical paper, paperboard, cardboard or plastic carton. As pointed out above, in nature the average feral cat hunts and eats five times a day. Accordingly, in accordance with one preferred aspect of this invention the package system 120 includes at least five feeding devices 124, each of which is filled with one fifth of a cat's daily ration of dry cat food. In the exemplary embodiment shown in FIG. 4, the package 122 includes twenty-five feeding devices 124, each of which contains one-fifth of the cat's daily ration of cat food. As such the package 122 provides sufficient feeding devices 124 to feed a cat for five days.

It should be noted that the foregoing arrangement is merely exemplary, such that the package 122 can be constructed to contain as many feeding devices 124 as required to provide a cat with his/her daily ration of cat food. Thus, manufacturers of cat food can package their product in packaging systems like those of this invention for use by cat owners, whereupon those cat owners can be assured that their cats can be fed their daily ration of cat food daily.

Figure 9:
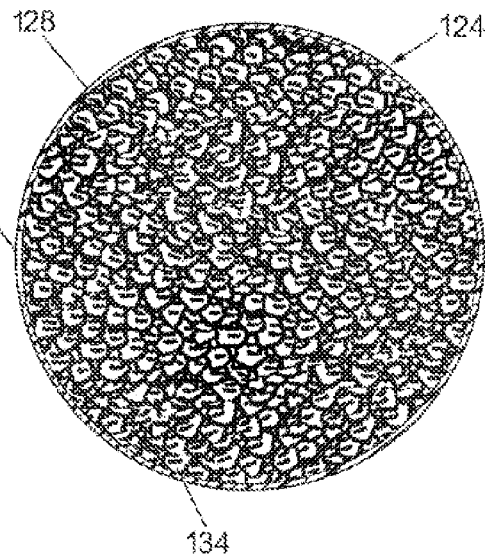
FIG. 9 is an enlarged sectional view of the exemplary feeding device taken along line 9-9 of FIG. 8.

Each feeding device 124 is preferably in the form of a hollow container or body having a central longitudinal axis 126 about which an arcuate sidewall 128 extends. The hollow container can be of any suitable shape, be it an ovoid, sphere, cylinder, etc. In the exemplary embodiment the device 124 is in the form of a cylindrical container having an arcuate, e.g., circular, sidewall 128 extending about the central longitudinal axis and a pair of planar end walls 130 and 132. The sidewalls and the end walls together bound a hollow interior cavity within the container in which the dry cat food 134 is located as can be seen in FIG. 9.

The feeding device 124 can be formed of any suitable material, e.g., paper, cardboard, paperboard, plastic or any combination thereof. The sidewall 128 includes at least one, and preferably several, frangible areas 136. Each frangible area is arranged to be opened by the person feeding the cat to form an outlet port through which the dry cat food 134 can pass when the feeding device is used by the cat. Each frangible area can be formed in various ways. For example, as shown each area 136 is formed by a line of perforations 138 in the sidewall, with each line bounding a respective frangible area. Thus, as will be appreciated by those skilled in the art the application of pressure on each of those areas by a person will cause the perforations to break, thereby providing an opening at each of those areas. Those formed openings serve as the outlet ports for the feeding device 124 to enable the egress of the cat food 134 therethrough.

Figure 8:
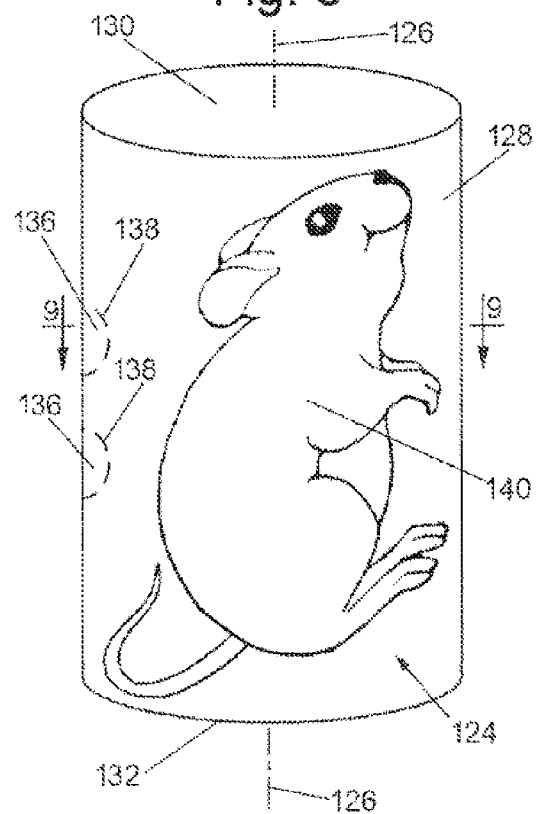
FIG. 8 is an enlarged isometric view of one of the exemplary feeding devices shown in FIG. 7.

As can be seen in FIGS. 7 and 8, each of the feeding devices 124 provides the visual appearance of an animal or creature, e.g., rodent, bird, fish, etc., that constitutes the prey of a feral cat. To that end, the outer surface of the device's sidewall 128 can be printed with graphics simulating the desired animal or creature. Alternatively, a printed sleeve or band bearing graphics simulating the desired animal or creature can be wrapped about the sidewall of the feeding device. In fact, any means can be used to provide the outer surface of the sidewall with the appearance of a desired animal or creature which constitutes prey of a feral cat. Moreover, the sidewall may be textured to enhance the appearance, e.g., the sidewall may include a sleeve of cover replicating fur.

In the exemplary embodiment shown the outer surface of the sidewall 128 of each feeding device 124 is printed with graphics 140 that provides the appearance of a mouse. Those graphics are is merely exemplary. Thus, each feeding device 124 may provide the appearance of some different animal or creature. In fact, the plural feeding devices 124 held within the package 122 may provide the appearance of more than one animal or creature, e.g., some feeding devices 124 in the package 122 may provide the appearance of a rodent, while other feeding devices in that package may provide the appearance of a bird, while still other feeding devices in that package may provide the appearance of a fish, etc. It should be appreciated that the graphics and decorations provided on sidewall 128 need not be limited to graphics simulating an animal or creature, and other desired designs or patterns may be used according to other embodiments of the invention, for example, such as those described above for skin 24.

By virtue of the fact that the sidewall 128 of each feeding device is arcuate (e.g., circular in the exemplary device 124 shown), that configuration enables the feeding device to rolled on any surface engaged by the sidewall. Thus, when a feeding device 124 is placed on the floor of the home in which the cat is to be fed, with the device's sidewall 128 engaging the floor, when the cat starts to play with the device, it will begin to roll about its central axis 126. That action will eventually orient the feeding device such that the dry cat food within its internal cavity to fall out of the outlet ports 136 for the cat to eat. The number, size, shape and positioning of the outlet ports can be selected to facilitate the automatic dispensing of the desired portion of the cat's daily ration of dry cat food from the feeding device.

A typical daily ration of dry cat food is approximately 1.25 cups for the average indoor cat. Thus, if the system makes use of five feeding devices 124, that 1.25 cups of dry cat food will be divided equally among those five feeding devices. In accordance with one exemplary embodiment of this invention each feeding device 124 has a length of approximately 3.5 inches and a diameter of approximately two inches.

In the embodiment of the feeding devices 124 shown in the drawing there are two frangible areas 136 in the sidewall 126 of each device. Each of those frangible areas is oval in shape and of a size of approximately 0.375 in. by 0.625 in. Those shapes, sizes and their arrangement are merely exemplary. Thus, each feeding device can include on or more frangible areas of any shape and size. Moreover, each of those areas can be located at any desired position on the sidewall 128. If more than one outlet is provided, the outlets may be arranged in any type of array. In any case, each outlet port is preferably of a sufficient size and shape to enable the dry cat food within the feeding device to gradually exit through the outlet port(s) as the cat plays with the feeding device.

As mentioned above, a preferred embodiment of the system of this invention makes use of five feeding devices 124 which are filled with the cat's regular dry food and which are disposed, e.g., hidden, at various locations in the cat's normal environment. Some cats may need a refresher course on how to "hunt" and hence feed themselves with the system of this invention. To that end, one can train the cat to use the system. In particular, such training can be accomplished by putting one half of the cat's regular meal in its bowl and one half into a feeding device constructed in accordance with this invention and which is placed near the cat's bowl. That feeding device may be in the form of the feeding device 124 as described earlier or a "trainer" device having more exit ports to allow the food to fall out more easily.

In any case, the training method should entail allowing the cat to experiment with getting the food out of the feeding device. Day after day as the cat gets the hang of it, one can gradually put more of the cat's food in the feeding device and less into the cat's bowl. Once the cat has the learned how to use the feeding device, one can then start hiding plural feeding devices in the cat's environment for it to find. Preferably that is done in the beginning by hiding the feeding devices in obvious places, e.g., a few feet away from the cat's regular dining spot. Gradually over the next few weeks, one can make the hiding spots more difficult to find. To enhance the training of the cat, one should attempt avoiding placing the feeding devices near things which produce mechanical noises, such as refrigerators, washing machines, dryers, furnaces, etc.

As should be appreciated by those skilled in the art, the fact that the feeding devices of the subject invention automatically dispense only a portion of the dry cat food therein as the cat plays with the device ensures that the release of the cat food is accomplished in a gradual manner. This action is important inasmuch as it forces the cat to slow down its eating process so that it doesn't gobble its food, which action could encourage vomiting.

While the preferred system as described above makes use of five feeding devices per day, the system may make use of any number of feeding devices per day, including only a single such device. Moreover, the construction of each feeding device may be different than the exemplary embodiment shown in FIGS. 7 and 8. For example, each feeding device may be constructed like the feeding device 20 shown in FIGS. 1-3, or the feeding device 50 of FIG. 6, or variants of any of those feeding devices.

Figure 10A:
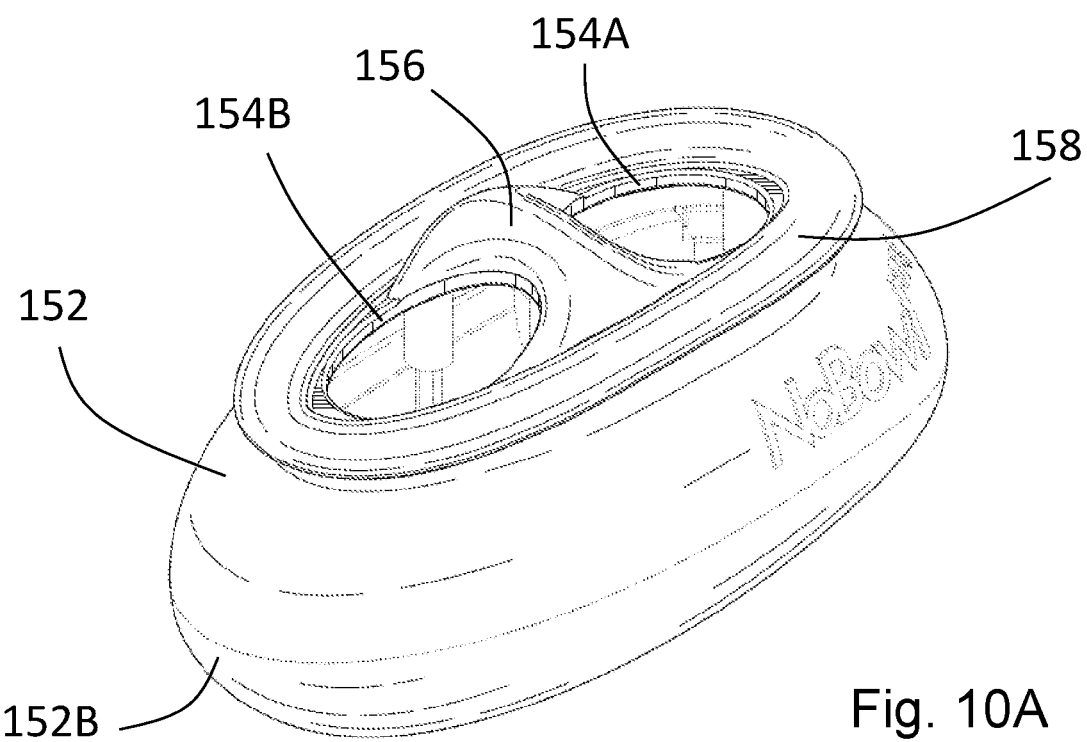
FIG. 10A is top, front perspective view of an exemplary hollow container according to a further embodiment of the present invention.
Figure 10B:
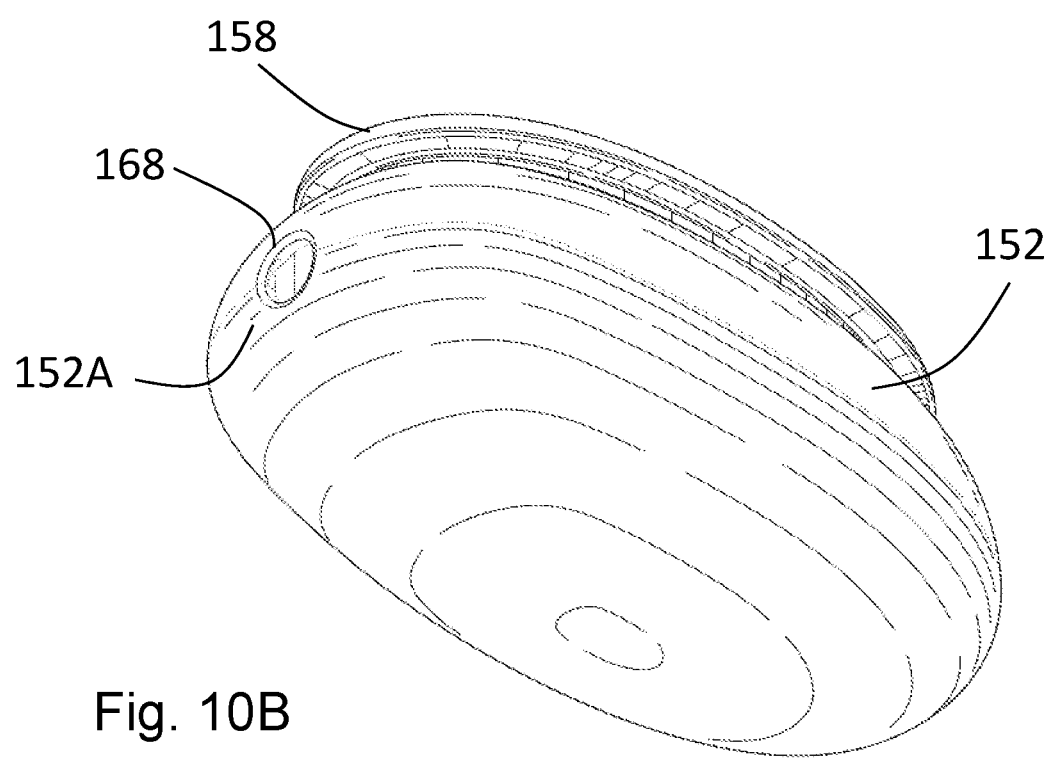
FIG. 10B is a bottom, rear perspective view of the hollow container of FIG. 10A.
Figure 11A:
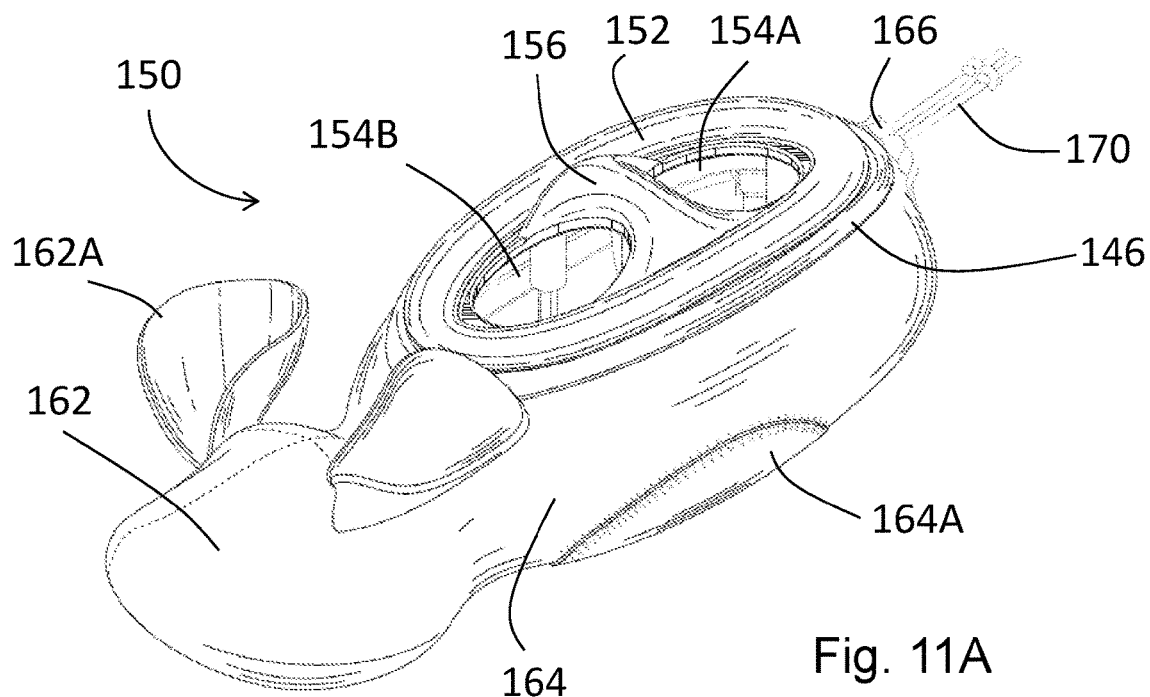
FIG. 11A is a top, front perspective view of the hollow container of FIG. 10A positioned within a simulation covering according to an embodiment of the present invention.
Figure 11B:
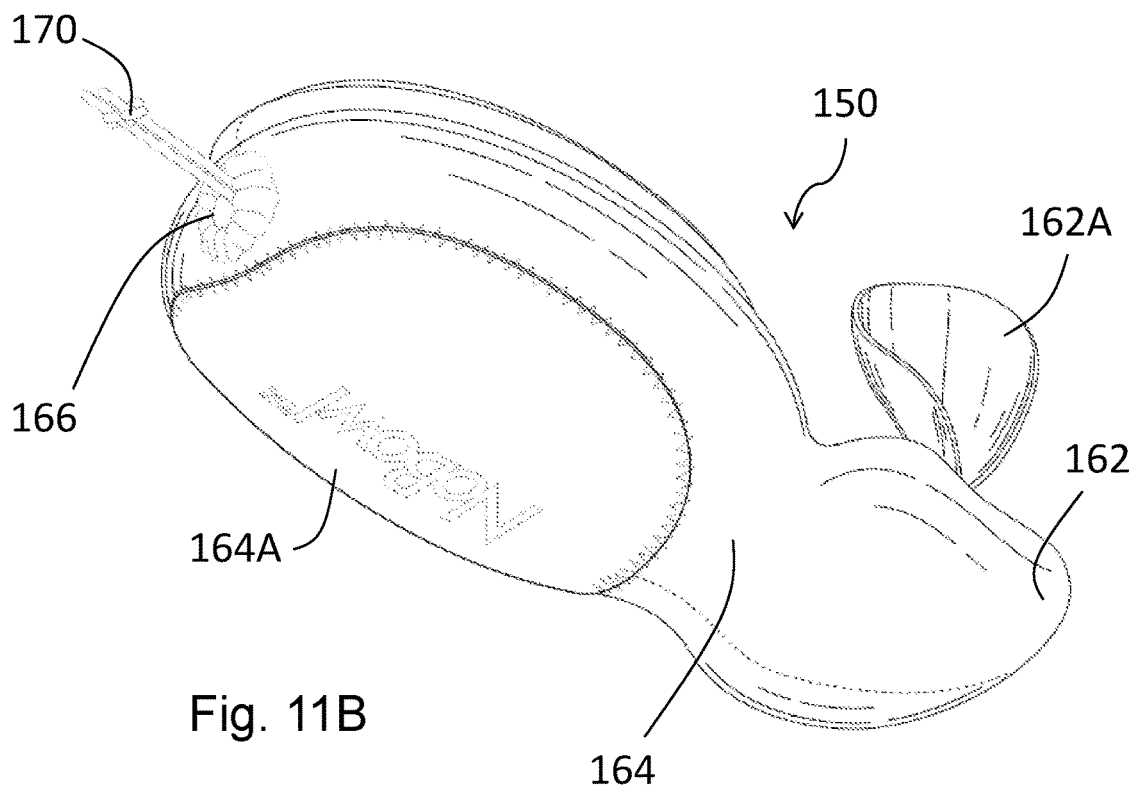
FIG. 11B is a bottom, rear perspective view of the hollow container and simulation covering of FIG. 11A.
Figure 11C:
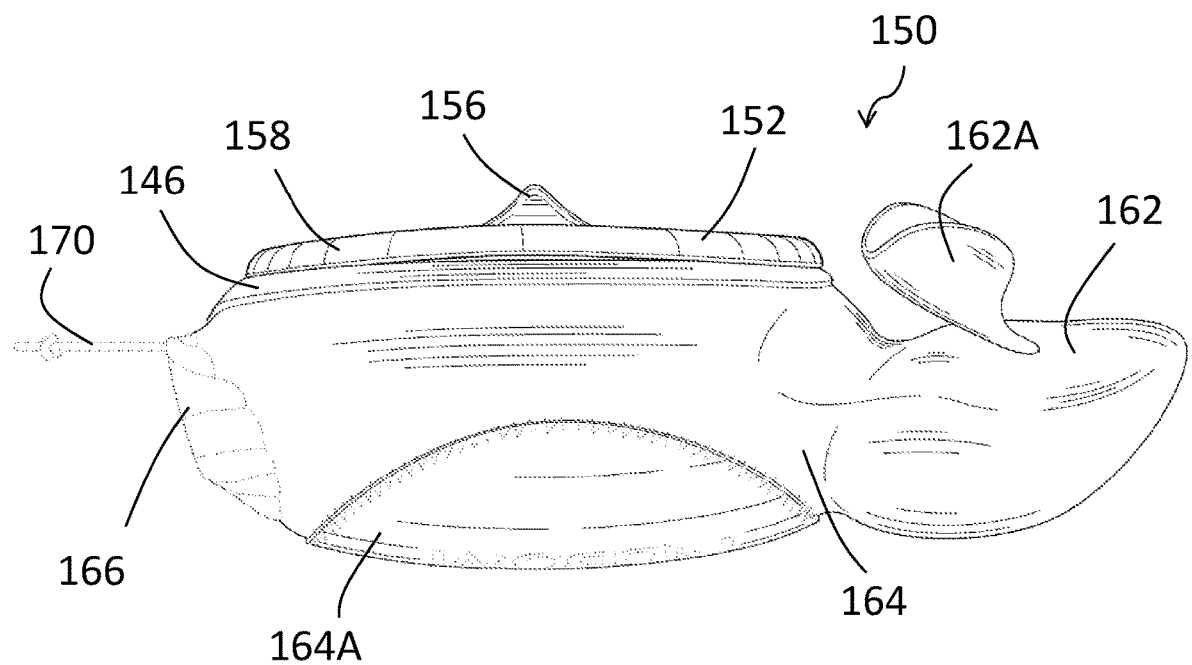
FIG. 11C is a side elevational view of the hollow container and simulation covering of FIG. 11A.
Figure 11D:
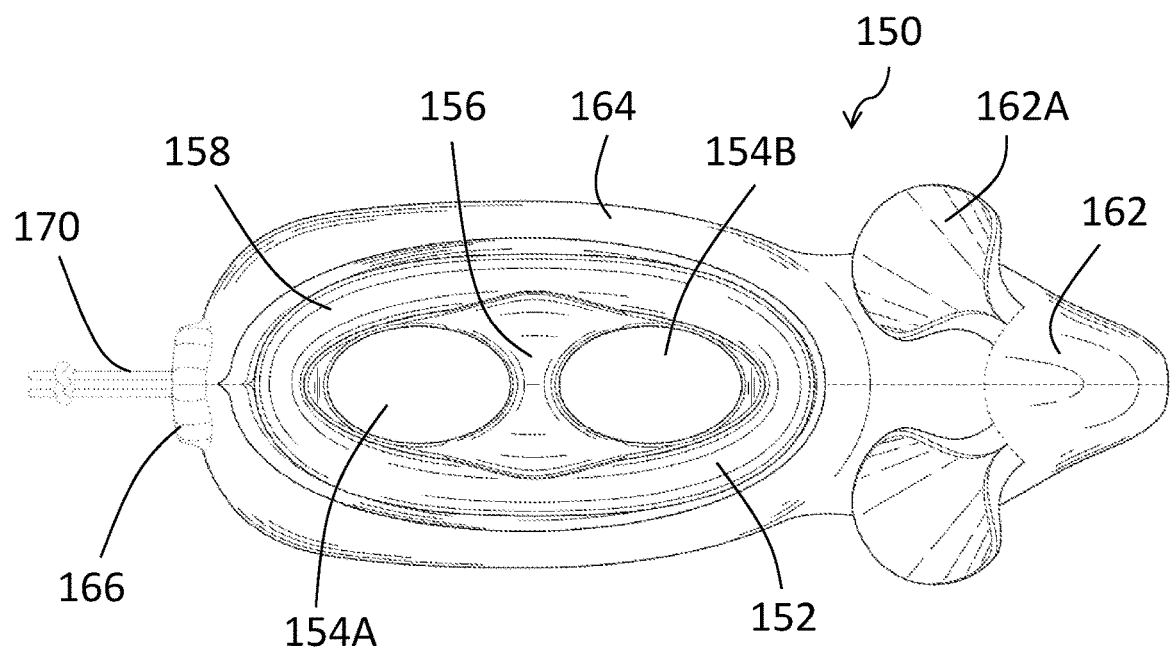
FIG. 11D is a top plan view of the hollow container and simulation covering of FIG. 11A.
Figure 12A:
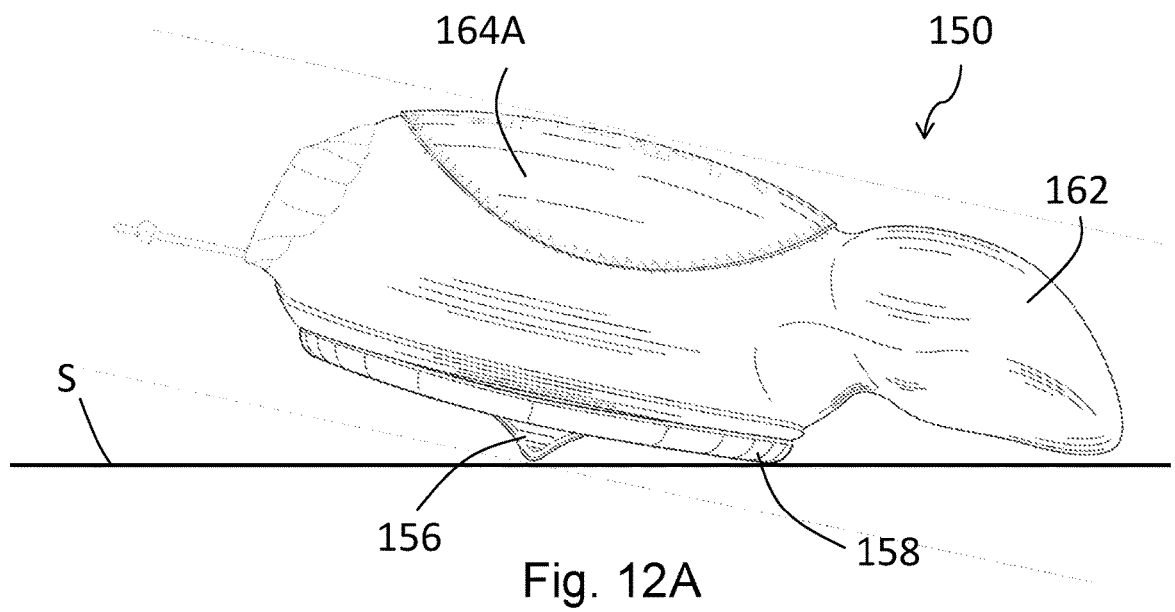
FIGS. 12A-12D show the hollow container and simulation covering of FIG. 11A in inverted positions over a surface according to embodiments of the present invention.
Figure 12B:
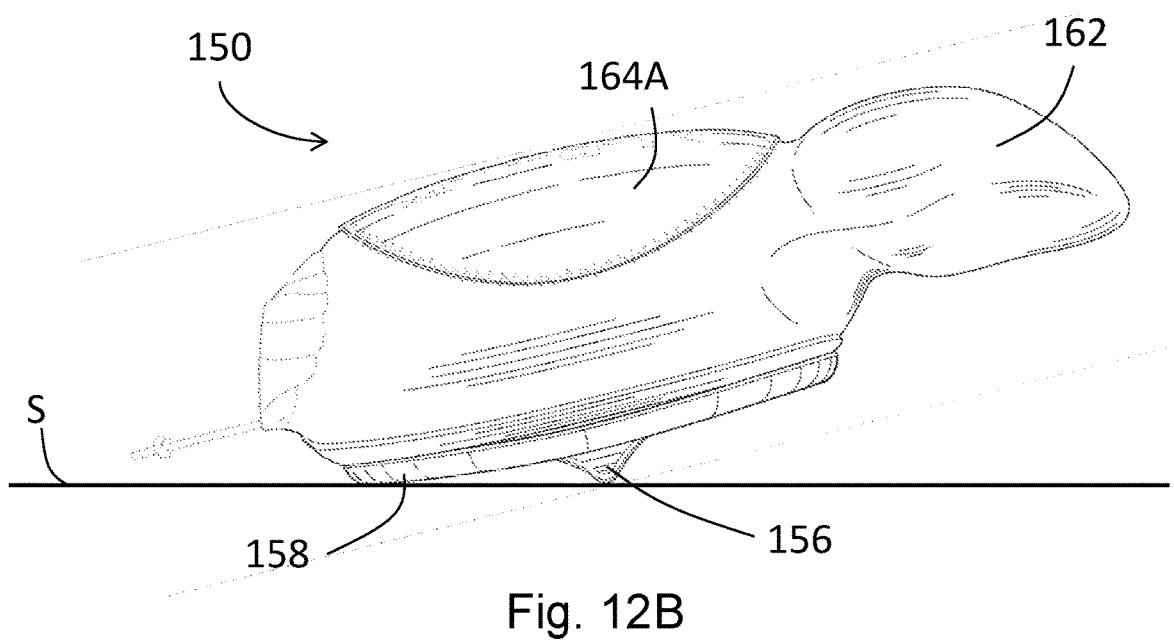
Figure 12C:
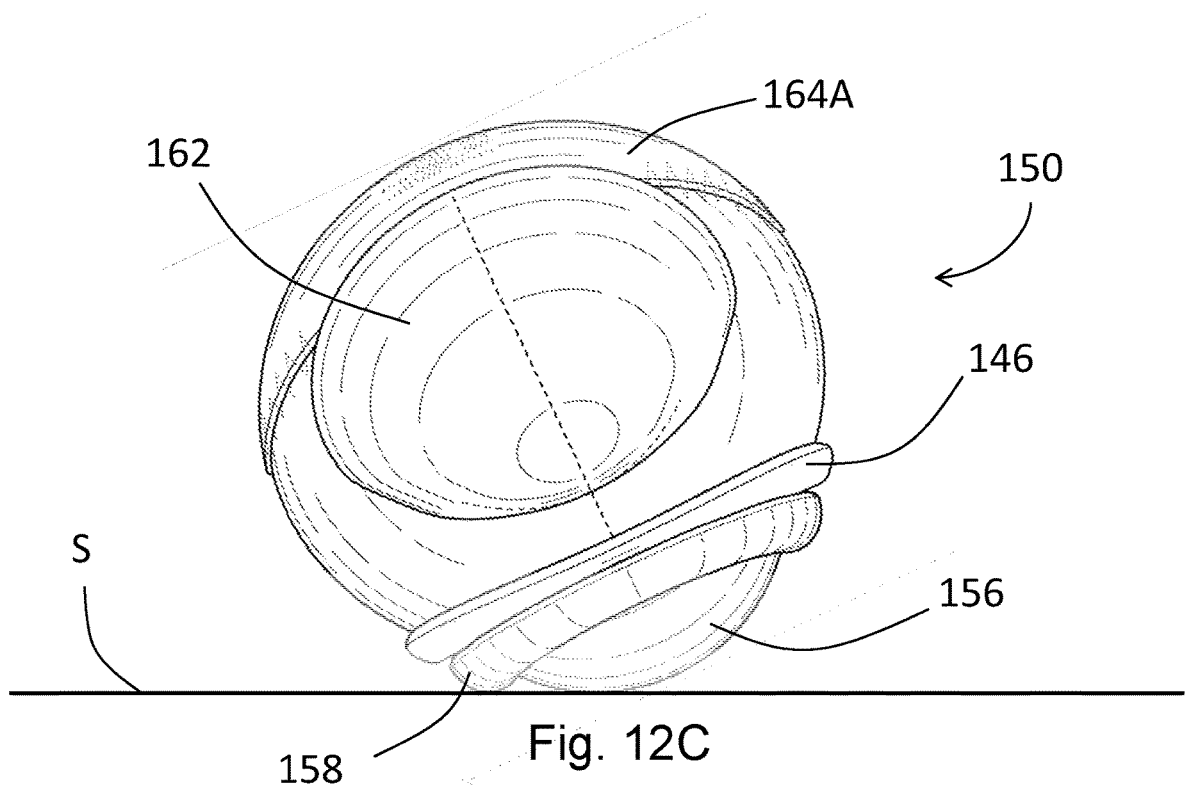
Figure 12D:
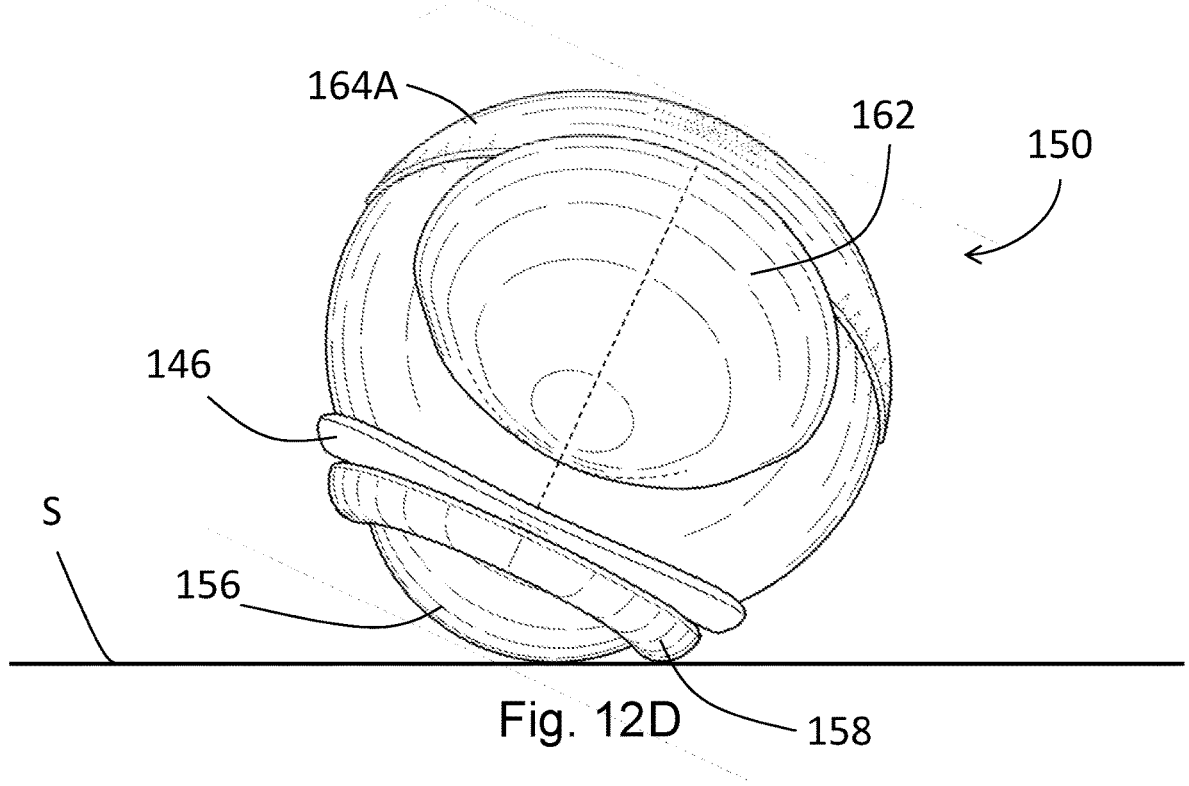
Figure 13A:
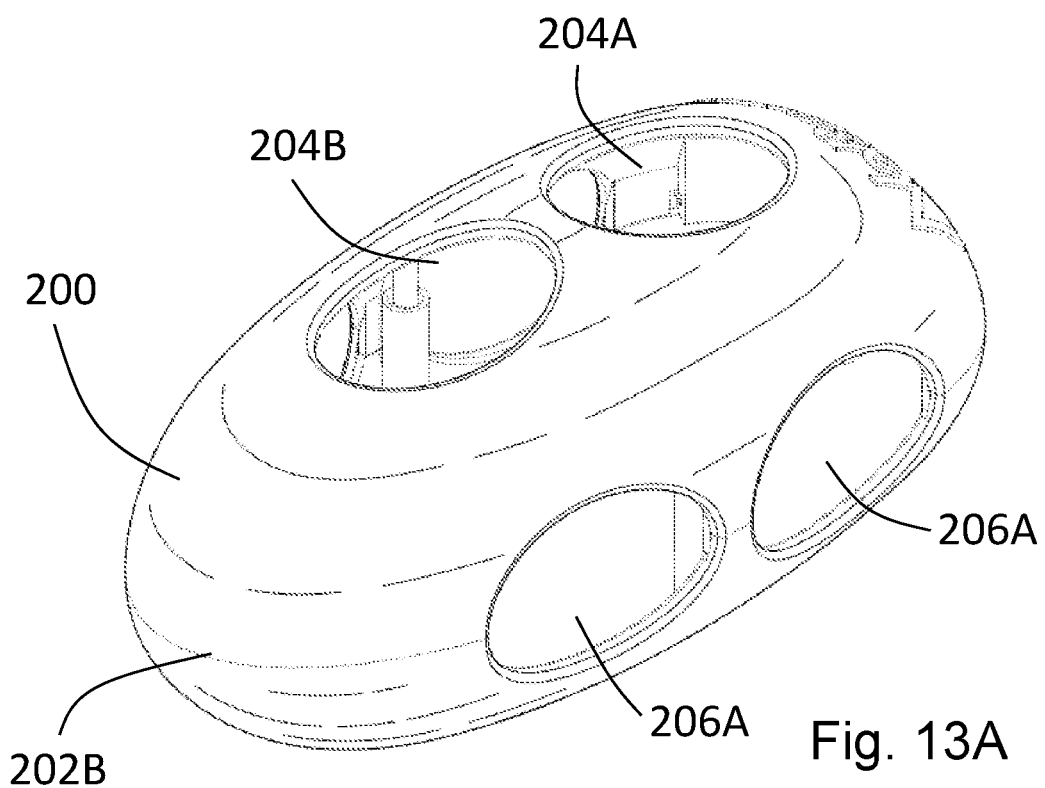
FIG. 13A is a top, front perspective view of a training container according to an embodiment of the present invention.
Figure 13B:
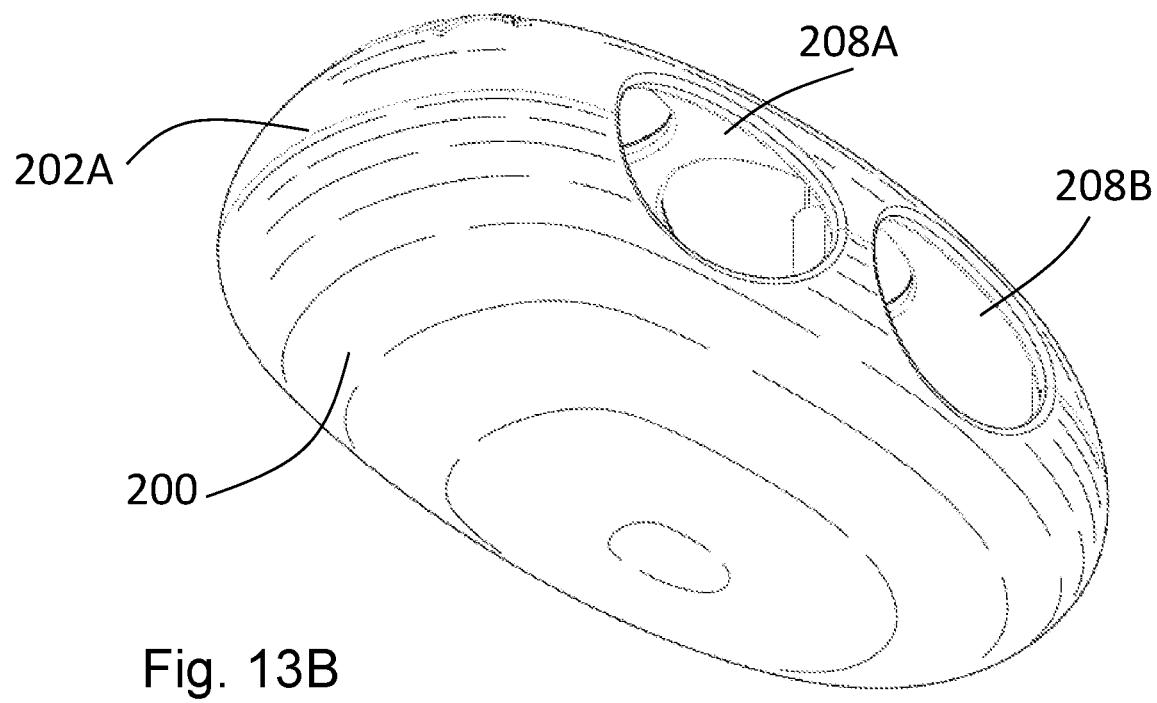
FIG. 13B is a bottom, rear perspective view of the training container of FIG. 13A.

FIGS. 10A-10E show another hollow container 152 which may be used in a feeding device according to yet a further embodiment of the present invention. In some embodiments, container 152 may have certain features which are similar to those described for container 52 shown in FIGS. 4-5B. In some embodiments, container 152 has a convexly curved exterior surface. In some embodiments, container 152 includes a generally ovoid shape having a rear end portion 152A and a front end portion 152B. A central longitudinal axis X (FIGS. 10C, 10D) extends between the front end portion 152B and the rear end portion 152A. As best seen in FIG. 10D, in some embodiments the rear end portion 152A has a lesser degree of curvature than the front end portion 152B and the container 152 is of a generally round cross-section as best seen in FIG. 10E. In one embodiment, the container 152 is generally egg shaped. In some embodiments, container 152 may be formed of a similar material to that of containers 22 and 52 described above. In some embodiments, container 152 is constructed from a rigid plastic material, which for example, may be molded. In some embodiments, container 152 is made from a food-grade, dishwasher-safe rigid plastic. In other embodiments, container 152 may be made of an elastic material, for example, silicone rubber or other elastomer. In some such embodiments, container 152 may be configured to bounce during use. In some embodiments, container 152 may be made from two or more separately molded components which are fixed together (e.g., snap fit, adhered, welded, etc.). In some embodiments, an outside surface of container 152 may also be decorated with a logo, color, pattern, or other graphics. In some embodiments, container 152 may have a length of about 80 mm to about 90 mm, a width of about 40 mm to about 45 mm, and a height of about 45 mm to about 50 mm.

Similar to container 52, in some embodiments container 152 does not include a hinged lid. In some embodiments, container 152 includes one or more ports which provide access to an interior space of container 152. In some embodiments, container 152 includes a pair of openings or ports 154A and 154B located on a top portion of container 152 through which container 152 may be filled with a portion of cat food. After container 152 is filled with the cat food (e.g., kibbles), the cat food may exit from container 152 via ports 154A and 154B when the feeding device is in use by a cat, similar to the configuration of container 52. In some embodiments, cat food may only be allowed to enter/exit container 152 via ports 154A and 154B. Ports 154A and 154B may each have an oval-like or elliptical shape and may be the same size and shape as each other according to some embodiments. In other embodiments, each port 154A and 154B may have dissimilar sizes and/or shapes. The size and shape of ports 154A and 154B should be selected to allow passage of cat food pellets. In some embodiments, each port 154A and 154B is an oval shape having a first dimension (e.g., width) of about 12 mm to 16 mm and a second dimension (e.g., length) of about 20 mm to about 25 mm. In one embodiment, each port 154A and 154B has dimensions of approximately 0.625 in. wide by approximately 0.81 in. long. It should be appreciated that other sizes and shapes suitable to allow passage of dry cat food pellets may be used for ports 154A and 154B according to other embodiments. It should also be appreciated that container 152 could be provided with only a single port in certain embodiments, or with more than two ports. In some embodiments, container 152 has at least two ports as shown in the illustrated embodiments. In some embodiments, the interior of container 152 may be provided with baffles and/or other physical obstacles which are configured to limit the ease through which food may exit container 152. In some embodiments, making it more difficult to extract food from container 152 by including the baffles and/or other obstacles in the interior of container 152 may provide additional stimulation to the cat since the cat will have to work harder for the food. In yet further embodiments, one or more of ports 154A, 154B may be provided with a device for changing the size of the port opening or closing the port in order to limit the ease through which food may exit container 152. For example, in some embodiments, one or more of ports 154A, 154B may include a sliding door, removable plug, or other adjustable barrier that is capable of reducing the size of and/or closing the opening of the port.

In certain embodiments, container 152 may optionally include a rear opening 168 located at rear end portion 152A. Rear opening 168 may be generally circular in shape and may be smaller than either port 154A and port 154B. In some embodiments, rear opening 168 may have a diameter of about 5 mm to about 7 mm, for example. In some embodiments, rear opening 168 may be sized such that whole cat food pellets cannot pass through rear opening 168. Similar to small aperture 68 described above in connection with container 52, in some embodiments rear opening 168 may be used to attach an additional component, for example, a device which simulates an animal's tail. In some embodiments, rear opening 168 may further help to drain liquid from the interior of container 152 when container 152 is washed.

In some embodiments, ports 154A and 154B are separated by a raised bridging wall 156 which extends outward away from ports 154A and 154B. In some embodiments, bridging wall 156 extends about 7 mm to about 10 mm away from ports 154A and 154B. As best shown in FIG. 10 E, bridging wall 156 may have a curved outer surface which, in some embodiments, may not be continuous with the curved periphery of the bottom portion of container 152. In some embodiments, as will be described further below, bridging wall 156 is configured to provide clearance between a portion of container 152 and a surface when container 152 is inverted onto the surface during use. In some embodiments, this clearance prevents blockage of one or both ports 154A, 154B by the surface to facilitate exit of cat food pellets from container 152 during use. In some embodiments, bridging wall 156 allows container 152 to rock back and forth in an inverted position during use. In further embodiments, a rounded ridge 158 projects outward from the outer surface of the container 152 and surrounds the area encompassed by the ports 154A and 154B and the intermediate bridging wall 156. In some embodiments, an annular groove 160 is located immediately below the ridge 158. In some embodiments, bridging wall 156 extends beyond ridge 158.

Referring now to FIGS. 11A-11D, in some embodiments container 152 is provided with a removable simulation covering 164 which is configured to fit over a portion of container 152. In some embodiments, container 152 together with simulation covering 164 make up a feeding device 150. In some embodiments, simulation covering 164 may be configured similarly to simulation covering 24 and 64 described previously. In some embodiments, simulation covering 164 is formed of a soft, flexible fabric or other similar material. In some embodiments, simulation covering 164 is preferably made from a machine-washable fabric for ease of cleaning. In some embodiments, simulation covering 164 is configured to simulate the appearance of an animal or creature, e.g., rodent, bird, fish, etc., that constitutes the prey of a feral cat. In the non-limiting exemplary embodiment shown in FIGS. 11A-11D, the simulation covering 164 provides the appearance of a mouse. In some embodiments, simulation covering 164 includes a projection 162 located at a front end which is in the shape of the head of the animal or creature which simulation covering 164 is simulating. As shown in the illustrated embodiments, projection 162 is shaped to resemble the head of the mouse. In some embodiments, projection 162 may be adorned with, for example, with ears 162A or other features (e.g., eyes, whiskers, teeth, etc.) to further resemble the head of an animal or creature.

In some embodiments, ears 162A and/or other adornments may be made from the same or different material than the rest of simulation covering 164, and may have different coloration to provide for visual contrast. In some embodiments, projection 162 may be filled with a soft and/or elastic material which helps maintain the three-dimensional shape of projection 162 and allows it to be safely chewed by a cat during use. As with skin 24 described above, it should be appreciated that simulation covering 164 may have any other appearance according to further embodiments of the invention, for example, circus or carnival characters, cartoon characters, famous persons or characters, holiday characters, etc. In yet further embodiments, simulation covering 164 may have the appearance of an inanimate object, for example, a sports ball (football, soccer ball, tennis ball, baseball, etc.) or an abstract shape. It should thus be appreciated that the specific appearance of simulation covering 164 is not necessarily limited to animals or the particular design shown in the illustrated embodiments of the appended Figures.

The central portion of the simulation covering 164 is in the form of a hollow pocket which is shaped and sized to receive and accommodate at least a portion of the container 152 therein. In some embodiments, simulation covering 164 is sized and configured to snugly fit around most or all of container 152 except for ports 154A and 154B, bridging wall 156, ridge 158, and rear opening 168. In some embodiments, simulation covering 164 includes a top opening through which bridging wall 156 and ridge 158 may extend outside of the simulation covering 164. The top opening may be bordered by edge 146 that is sized to seat against ridge 158 and fit, at least partially, within groove 160 of container 152. In some embodiments, when container 152 is disposed within the pocket of simulation covering 164, edge 146 will tightly engage groove 160 of container 152 to prevent container 152 from significantly shifting relative to simulation covering 164. In some embodiments, ridge 158 is configured to prevent simulation covering 164 from shifting over ports 154A and 154B, which would block cat food pellets from exiting container 152. Edge 146, in some embodiments, may include an elasticized band to further help provide a secure fit around container 152. In further embodiments, edge 146 may be colored differently than other portions of simulation covering 164 to provide visual contrast.

In some embodiments, simulation covering 164 is configured to fit around container 152 such that projection 162 is positioned proximate front end portion 152B of container 152 during use. In some embodiments, simulation covering 164 further includes an opening 166 at a rear end, opposite of projection 162. In some embodiments, opening 166 provides access to rear opening 168 of container 152. In some embodiments, container 152 may be inserted into and/or removed from simulation covering 164 through opening 166. In some embodiments, opening 166 may be cinched closed using a drawstring 170 which is threaded around opening 166. In certain embodiments, after opening 166 is cinched closed, one or both ends of drawstring 170 may extend from the rear end of simulation covering 164 to mimic an animal's tail. Drawstring 170 may be any suitable elastic cord, string, rope, etc. In other embodiments, where a separate tail (e.g., tail 70) is mounted onto rear opening 168 of container 152, the tail may extend through opening 166 of simulation covering 164.

In further embodiments, simulation covering 164 may include a bottom patch 164A which covers a bottom portion of simulation covering 164 opposite the top opening. Bottom patch 164A may be decorated with, for example, a logo, colors, patterns, or other graphics. In some embodiments, bottom patch 164A may also provide extra durability to the bottom portion simulation covering 164. In some embodiments, bottom patch 164A, edge 146, ears 162A, and/or drawstring 170 may have a first color whereas the rest of simulation covering 164A has a second different color to provide for visual contrast. In other embodiments, where simulation covering 164 is intended to resemble an animal, simulation covering 164 may also have additional graphics, patterns, or designs to help simulate the animal which is being mimicked. For example, graphics or patterns representing the animal's legs, fins, wings, fur, scales, feathers, etc., may be included on the simulation covering 164 according to some embodiments.

Feeding device 150 comprising container 152 and simulation covering 164 may be used in the same manner as described for feeding devices 20 and 50 described above for providing food and stimulation to a cat. In some embodiments, one or more feeding devices 150 are each filled with a portion of cat's daily food amount and are disposed or hidden throughout the cat's environment. In some embodiments, for example, five feeding devices 150 may be distributed with each feeding device 150 being filled with a fifth of the cat's daily food amount. The cat will "hunt" for the feeding devices 150, thereby providing the cat with natural stimulation. By simulating a prey animal (e.g., rodent, bird, fish, etc.), the cat may be stimulated to interact with feeding device 150 as it would with actual prey animals, for example, swatting at feeding device 150 with its paws, lifting feeding device 150, biting feeding device 150, etc. Owing to the shape of the feeding device 150, feeding device 150 is configured to roll at least partially about its longitudinal axis, and a portion of the cat food within the feeding device will be gradually dispensed out of feeding device 150 via ports 154A and/or 154B, thereby enabling the cat to eat the dispensed food. For example, when feeding device 150 is inverted during the cat's interaction with feeding device 150, the cat food may tumble out of container 152 via ports 154A and/or 154B due to gravity. In further embodiments, feeding device 150 may be configured to bounce against surfaces during use.

FIGS. 12A-12D show feeding device 150 in various inverted positions against a surface S, which may represent a floor or other surface upon which feeding device 150 is located. Ears 162A have been omitted for clarity in these views. In some embodiments, feeding device 150, when inverted, is able to rock forward and backward (FIGS. 12A, 12B) and/or roll side to side (FIGS. 12C, 12D) on surface S by virtue of bridging wall 156 which contacts surface S. In some embodiments, such motion may help to dispense food from feeding device 150. The motion may also be limited by ridge 158, a portion of which may also contact surface S when feeding device 150 is inverted. As can be further seen in these illustrated embodiments, feeding device 150 is configured such that when inverted, bridging wall 156 provides some clearance between surface S and feeding device 150. This clearance prevents surface S from blocking port 154A and/or port 154B which could otherwise limit food from exiting ports 154A and/or 154B.

In further embodiments, simulation covering 164 and/or container 152 may be provided with a tracking device which allows a user to locate, track, and/or detect the movement of feeding device 150. In some embodiments, for example, the tracking device may be positioned within projection 162 of simulation covering 164. The tracking device may be removable from or permanently attached to simulation covering 164 or container 152. The tracking device in some embodiments may be configured to send a signal or communication to a user's phone, computer, or other electronic device to indicate the location and/or movement of the feeding device 150. In some embodiments, the tracking device may include, for example, a GPS device. In some embodiments, the tracking device may include a motion sensor. In further embodiments, the tracking device may include Bluetooth or other wireless communication technology. In some embodiments, being able to track the movement of feeding device 150 may help a user determine, for example, if and when a cat has interacted with the feeding device 150 and whether it needs to be refilled or replaced. For example, if a feeding device 150 does not register any change in location or movement, it may mean that the feeding device 150 has not been found by the cat and therefore does not need to be refilled/replaced yet. Lack of movement may also suggest that the feeding device 150 has been too well hidden for the cat to locate and therefore the user should consider positioning the feeding device 150 elsewhere for the cat to find. Being able to locate the feeding device 150 may also be useful, for example, if the cat has carried the feeding device far from its original location.

A feeding system according to certain embodiments may also include a separate training device which may be used to train a cat to interact with the feeding devices of the present invention. FIGS. 13A-13F show a training device 200 according to some embodiments. Training device 200 in some embodiments is a hollow container having a generally ovoid shape with a rear end portion 202A and a front end portion 202B. In some embodiments, training device 200 includes a convexly curved exterior and is configured to roll against a surface. In some embodiments, the size and ovoid shape of training device 200 is similar to the size and shape of container 152. In some embodiments the rear end portion 202A has a lesser degree of curvature than the front end portion 202B, and the training device 200 has a generally round cross-section. In one embodiment, the training device 200 is generally egg shaped. In some embodiments, the round cross-section is configured to allow training device 200 to roll about its longitudinal axis. Training device 200, furthermore, may be made from the same material as container 152 (e.g., a rigid plastic). In some embodiments, training device 200 may be made of an elastic material, for example, silicone rubber or other elastomer. In some such embodiments, training device 200 may be configured to bounce during use.

Similar to feeding device 150, training device 200 is configured to be filled with cat food, particularly dry cat food pellets, and to dispense the food when interacted with by a cat. However, unlike feeding device 150, in some embodiments training device 200 is configured to dispense the cat food more readily than feeding device 150. In some embodiments, training device 200 includes more ports than container 152. For example, in the illustrated embodiments, training device 200 may include at least six ports 204A, 204B, 206A, 206B, 208A, 208B, which may be arranged in pairs positioned along different portions of training device 200. It should be appreciated that fewer or more than six ports may be included according to other embodiments. In some embodiments, training device 200 includes two ports 204A, 204B positioned along a top portion of training device 200. In some embodiments, training device 200 further includes two ports 206A, 206B along a first side, and two ports 208A, 208B along a second side. Ports 206A, 206B may be diametrically opposed to ports 208A, 208B, respectively. In some embodiments, a bottom portion of training device 200 does not include any ports. In some embodiments, each of port 204A, 204B, 206A, 206B, 208A, 208B may be similarly sized and oval-shaped. In some embodiments, ports 204A, 204B, 206A, 206B, 208A, 208B may be similarly sized and shaped as port 154A and/or 154B of container 152. In other embodiments, ports 204A, 204B, 206A, 206B, 208A, 208B may have different sizes and shapes. By having more ports than feeding device 150, training device 200 in some embodiments will more readily dispense food when rolled. Furthermore, unlike container 152 of feeding device 150, training device 200 does not include a raised bridging wall or ridge according to some embodiments. Moreover, training device in some embodiments is not intended to be used with a simulation covering. By omitting these features from training device 200, training device 200 is configured to be more easily rolled by the cat to dispense food. In some embodiments, the interior of training device 200 may be provided with baffles and/or other physical obstacles which are configured to limit the ease through which food may exit training device 200. In some embodiments, making it more difficult to extract food from training device 200 by including the baffles and/or other obstacles in the interior of training device 200 may provide additional stimulation to the cat since the cat will have to work harder for the food. In yet further embodiments, one or more of ports 204A, 204B, 206A, 206B, 208A, 208B may be provided with a device for changing the size of the port opening or closing the port in order to limit the ease through which food may exit training device 200. For example, in some embodiments, one or more of ports 204A, 204B, 206A, 206B, 208A, 208B may include a sliding door, removable plug, or other adjustable barrier that is capable of reducing the size of and/or closing the opening of the port.

In use, according to one method of the present invention, training device 200 may be filled with a portion of cat food, for example, a fifth of a cat's daily food amount. The food-filled training device 200 may then be given directly to the cat or hidden somewhere in the cat's environment to be found by the cat. The food contained within training device 200 will be dispensed through ports 204A, 204B, 206A, 206B, 208A, 208B as the cat interacts with training device 200 (e.g., rolls, lifts, shakes, tumbles, bounces training device 200). Because of the higher number of ports in training device 200, the food will be dispensed more easily than with feeding device 150. This in turn may result in a quicker and easier reward for the cat, which helps reinforce the cat's behavior to feed from such a device (as opposed to, for example, a standard food bowl). In some embodiments, a portion of a cat's daily food amount (e.g., one fifth) may be provided using training device 200 while the remaining amount (e.g., four fifths) may be provided in a traditional manner (e.g., bowl feeding). This feeding routine may be repeated daily until the cat has become fully accustomed to extracting food from training device 200. Subsequently, the training device may be replaced with a feeding device (e.g., feeding device 20, 50, or 150), which by virtue of having fewer ports, dispenses food less easily than training device 200. Eventually, a cat may be able to obtain its entire daily food amount using the feeding devices. For example, in some embodiments, the cat's total daily food amount may be divided into a plurality of feeding devices (e.g., five feeding devices 150) which are distributed throughout the cat's environment. The cat must then hunt for each of the plurality of feeding devices throughout the day to obtain its total daily food ration. Thus, in some embodiments, a feeding system of the present invention including a plurality of feeding devices (e.g., five feeding devices 150) and a training device 200 may offer a complete feeding system for a cat, providing multiple portion-controlled feeding devices to hunt throughout the course of the day and allowing the cat to be in charge of its own feeding schedule.

Figure 14A:
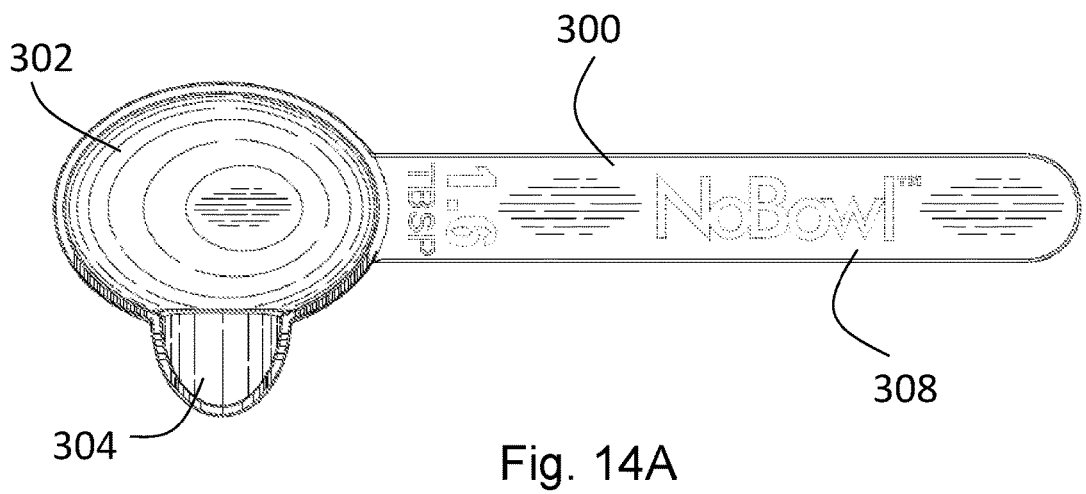
FIG. 14A is top plan view of a measuring device according to an embodiment of the present invention.
Figure 14B:
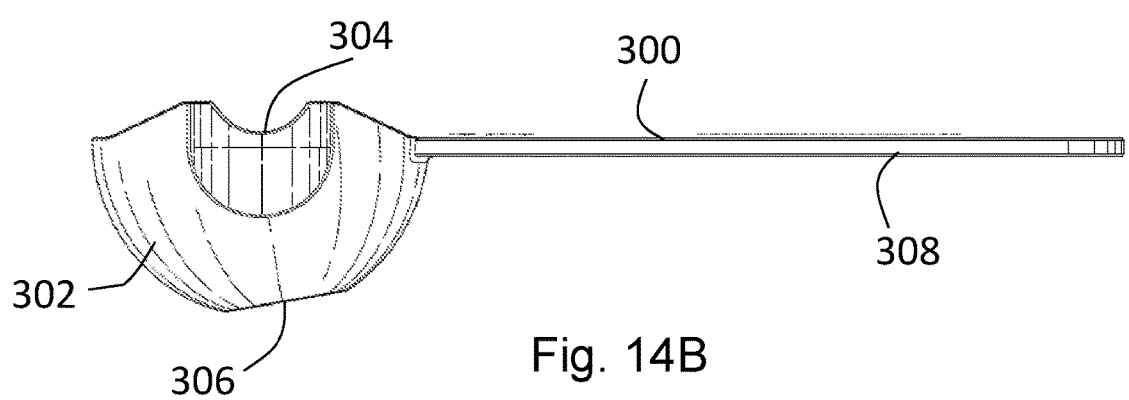
FIG. 14B is a side elevational view of the measuring device of FIG. 14A.
Figure 14C:
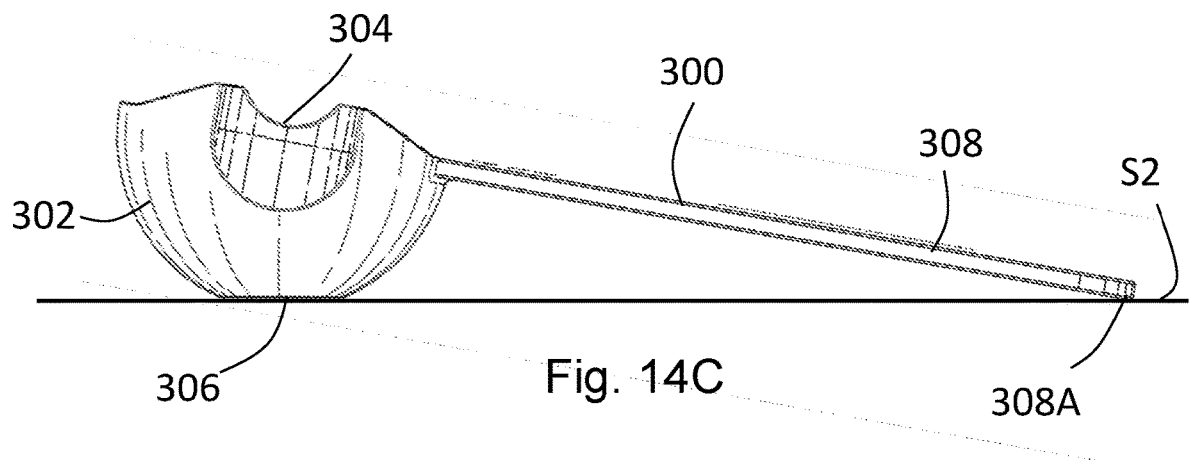
FIG. 14C shows the measuring device of FIG. 14A positioned on a surface according to an embodiment of the present invention.

In some embodiments, a feeding system according to the present invention may further include a measuring device to assist with proper food portioning in feeding device 150 and/or training device 200. FIGS. 14A-14C illustrate an example measuring device 300 according to an embodiment of the present invention. In this embodiment, measuring device 300 may be generally configured as a measuring spoon or cup having a bowl 302 and a handle 308 extending from bowl 302. In some embodiments, bowl 302 has a predetermined volume and may be configured to contain, for example, a fifth of a cat's daily food amount. In one embodiment, bowl 302 is configured to contain about 1.6 tbsp of food. It should be appreciated that measuring device 300 may have smaller or greater volumes according to other embodiments. In some embodiments, bowl 302 may further include a spout 304 which extends from a side of bowl 302. In some embodiments, spout 304 may extend from bowl 302 in a direction that is perpendicular than a longitudinal axis of handle 308. Spout 304, in some embodiments, may be particularly sized and configured to channel food from bowl 302 into ports 154A and/or 154B of container 152 or ports 204A, 204B, 206A, 206B, 208A, 208B of training device 200. In yet further embodiments, bowl 302 may include a flattened bottom 306. In some embodiments, flattened bottom 306 is configured to allow measuring device 300 to sit on a flat surface S2 without tipping. In some embodiments, flattened bottom 306 may be particularly angled to be coplanar with an end 308A of handle 308 such that flattened bottom 306 and end 308A may both rest on surface S as shown in FIG. 14C.

Figure 15:
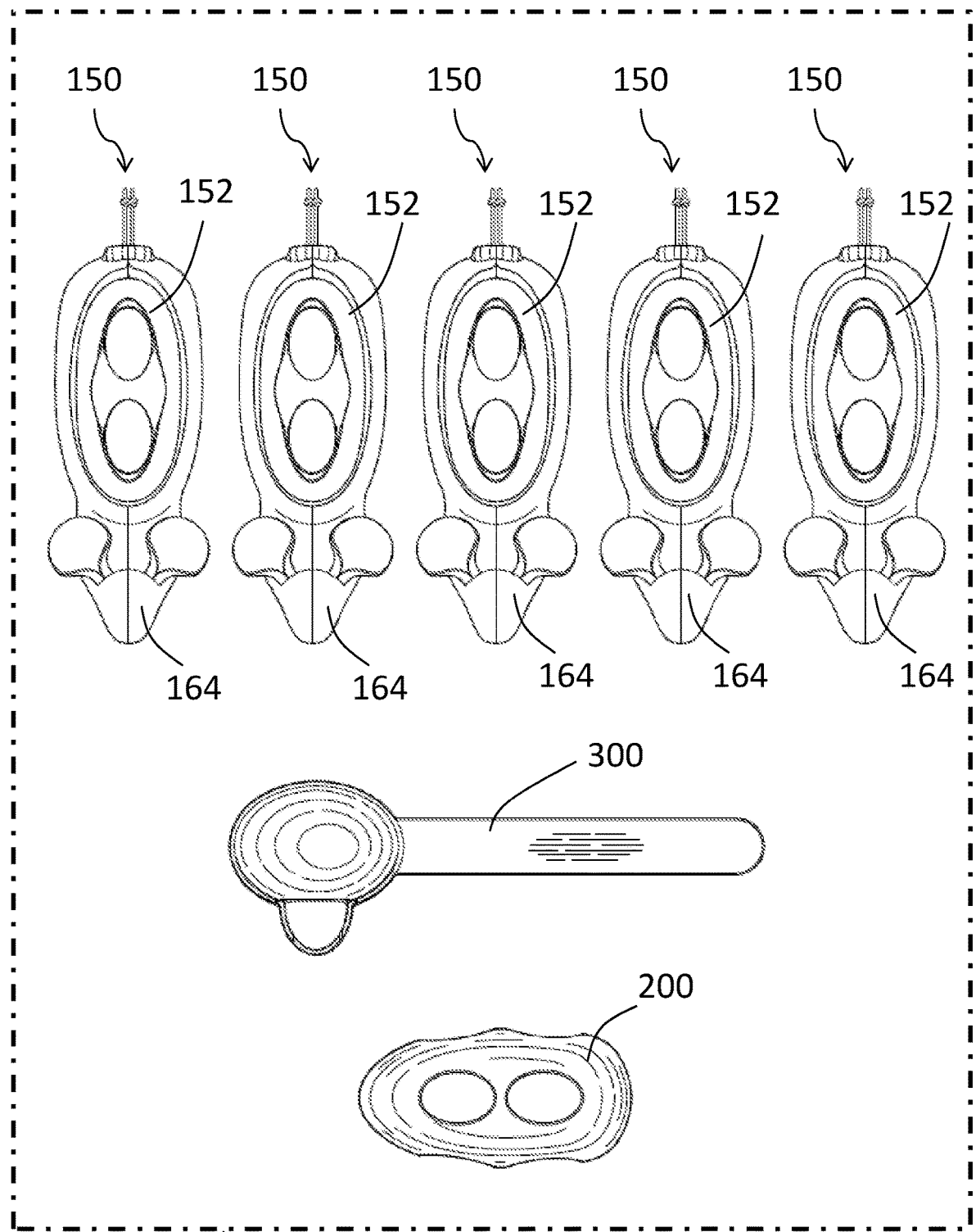
FIG. 15 shows a kit including a plurality of hollow containers, a training container, and a measuring device according to an embodiment of the present invention.

In some embodiments, two or more of any of the components described herein may be provided as a kit. FIG. 15 illustrates one kit according to an embodiment of the present invention. In this embodiment, the kit includes a plurality of feeding devices 150 and at least one training device 200. In some embodiments, the kit may further include at least one measuring device 300. In some embodiments, the kit includes five feeding devices 150, one training device 200, and one measuring device 300. In other embodiments, a kit may include 5X feeding devices 150 and X training devices 200, where X is a positive integer and, for example, may be equal to the number of cats the kit is designed to accommodate (e.g, X=1, 2, 3, 4, 5, 6, etc.). In yet further embodiments, a kit may include 5X feeding devices 150, X training devices 200, and X measuring devices 300. Each feeding device 150 includes a container 152 and a simulation covering 164. In some embodiments, a kit may also include a separate tracking device for each feeding device 150 contained in the kit. In some embodiments, each of the containers 152 and simulation coverings 164 included in a kit may be the same. In other embodiments, a single kit may include different simulation coverings 164, for example, differently colored simulation coverings 164 or simulation coverings 164 which mimic different prey animals (e.g., mouse, fish, bird, etc.), characters, or other shapes. In some embodiments, all the components of a kit may be packaged in a single package or box 400. A kit may also include an instruction pamphlet, booklet, or brochure (not shown), which describes any one or more of the methods of use according the present invention. The instructions may alternatively be printed on box 400.

As noted above, in some embodiments, certain feeding systems and kits of the present invention are configured to provide a complete feeding system for a cat. In some embodiments, feeding systems and kits of the present invention are configured to supply a cat's entire daily ration of food. In some embodiments, for example, a feeding system or kit of the present invention may be used to replace a cat's other means for feeding, e.g., a typical food bowl, or as a device (perhaps smaller in size) for releasing treats for the cat. In some embodiments, a feeding systems and kits of the present invention is configured to provide a cat with multiple portion-controlled feeding devices to hunt throughout the course of the day and can therefore allow the cat to be in charge of its own feeding schedule.

One example method of training a cat using a kit or feeding system according to the present invention which comprises at least five feeding devices 150, a training device 200, and a measuring device 300 includes the following steps:

1. Measure out a cat's daily dry food (kibble) ration. Measure out a portion of the daily food ration (e.g., two scoops of the food using measuring device 300) into the cat's normal food bowl and add a smaller portion of food (e.g., one scoop using measuring device 300) into training device 200. Place the training device 200 next to the food bowl. Place a few pieces of dry food on the floor around the training device 200. If the cat can empty the training device 200, refill it with food two to three more times over the course of the day. Any remaining food form the daily ration can be put in the training device 200 or the normal food bowl. If the cat fails to empty the training device 200 of food, show the cat by tipping the training device to release the food onto the floor. Treats (e.g., bonito flakes) may also be added to the training device 200 along with the dry food to encourage the cat to use the training device 200. Repeat this process for a few days, or until the cat is comfortable feeding from the training device 200.

2. Measure out the cat's daily dry food ration. Place a few pieces of the food in the normal food bowl. Place a portion of the food in the training device 200. Split the remainder of the food between the at least five containers 152 without simulation coverings 164. Allow the cat time to extract food from the five containers 152. If the cat is not emptying the containers 152 in a day, show the cat by tipping the containers 152 to release the food onto the floor. Refill and replace the containers 152 daily until the cat understands how to empty them. This may take a few days, or a few weeks. If the cat is not eating a sufficient amount on a daily basis, additional food may be given in the normal food bowl or training device 200 to make up for the deficiency.

3. Repeat step 2 above except using the at least five containers 152 with the simulation coverings 164. Repeat daily until the cat understands how to empty feeding devices 150.

4. Divide the cat's daily dry food ration among the at least five feeding devices 150. Position the feeding devices 150 in various locations within the cat's environment and allow the cat to hunt for them. Refill and hide the feeding devices 150 daily.

While the embodiments described herein are illustrative of systems, kits, and methods that are particularly useful for feeding cats, the systems, kits and methods of the present invention are not necessarily limited to this use. Some embodiments of the present invention may be also be used for feeding other animals and pets, for example, dogs, rodents, ferrets, birds, zoo animals, etc. The components described herein can be manufactured in other sizes accordingly to accommodate other animals and pets.

It should be understood that various changes, substitutions, and alterations can be made herein without departing from the spirit and scope of the invention as defined by the appended claims. It should also be apparent that individual elements identified herein as belonging to a particular embodiment may be included in other embodiments of the invention. Moreover, the scope of the present application is not intended to be limited to the particular embodiments of the process, machine, manufacture, and composition of matter, means, methods and steps described in the specification. As one of ordinary skill in the art will readily appreciate from the disclosure herein, processes, machines, manufacture, composition of matter, means, methods, or steps that perform substantially the same function or achieve substantially the same result as the corresponding embodiments described herein may be utilized according to the present invention.

We claim:

1. A cat feeding system comprising:
   a plurality of feeding devices, each of the plurality of feeding devices including:
      a container for containing and dispensing a portion of cat food, the container comprising a convexly curved external surface, a first port and a second port arranged along a top portion of the container, each of the first port and the second port providing access to an interior space of the container, and a bridging wall separating the first port and the second port, the bridging wall extending above the first port and the second port; and
      a simulation covering constructed from a flexible material, the simulation covering including a pocket for receiving at least a portion of the container therein without covering the first port and the second port.

2. The cat feeding system of claim 1, wherein the container has an ovoid shape.

3. The cat feeding system of claim 1, wherein the container further comprises a raised ridge surrounding the first port, the second port, and the bridging wall.

4. The cat feeding system of claim 3, wherein the simulation covering is sized and shaped to form a tight fit around substantially all of the container except for the first port, the second port, the bridging wall, and the raised ridge.

5. The cat feeding system of claim 1, wherein the simulation covering includes a front end including a projection having a three-dimensional shape which mimics an appearance of a head of an animal.

6. The cat feeding system of claim 5, wherein the simulation covering includes a rear end opposite the front end, the rear end having a rear opening that is sized to receive the container therethrough.

7. The cat feeding system of claim 6, wherein the rear end of the simulation covering further includes a drawstring threaded around the rear opening, the drawstring being configured to cinch the rear opening closed.

8. The cat feeding system of claim 1, wherein each of the plurality of feeding devices further includes a tracking device configured to communicate a location and/or movement of the feeding device.

9. The cat feeding system of claim 1, further comprising at least one training device, the training device comprising a second container for containing and dispensing a portion of cat food, the second container comprising a convexly curved external surface and having more than two ports providing access to an interior space of the second container.

10. The cat feeding system of claim 9, wherein the training device has an ovoid shape.

11. The cat feeding system of claim 9, wherein the second container of the training device includes at least three pairs of ports.

12. The cat feeding system of claim 9, wherein the first port and the second port of each of the plurality of feeding devices and the ports of the training device have substantially the same size and shape.

13. The cat feeding system of claim 12, wherein the shape of the ports is an oval shape.

14. The cat feeding system of claim 9, wherein the feeding system includes 5X feeding devices and 1X training devices, wherein X is a positive integer.

15. The cat feeding system of claim 9, wherein the feeding system further comprises at least one measuring device for measuring a predetermined volume of cat food into each of the plurality of feeding devices and/or the training device.

16. The cat feeding system of claim 1, wherein the first port and/or the second port includes a limiting device for reducing the size of and/or closing the port.

17. The cat feeding system of claim 16, wherein the limiting device comprises a sliding door.

* * * * *